(12) United States Patent
Mohanty et al.

(10) Patent No.: US 7,253,221 B2
(45) Date of Patent: Aug. 7, 2007

(54) COMPOSITIONS OF CELLULOSE ESTERS AND LAYERED SILICATES AND PROCESS FOR THE PREPARATION THEREOF

(75) Inventors: Amar K. Mohanty, Lansing, MI (US); Lawrence T. Drzal, Okemos, MI (US); Hwanman Park, East Lansing, MI (US); Manjusri Misra, Lansing, MI (US); Arief C. Wibowo, Bandung (ID)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 11/111,362

(22) Filed: Apr. 21, 2005

(65) Prior Publication Data

US 2006/0058425 A1 Mar. 16, 2006

Related U.S. Application Data

(60) Provisional application No. 60/566,642, filed on Apr. 30, 2004.

(51) Int. Cl.
*C08K 3/34* (2006.01)
*C08K 9/04* (2006.01)
*C09D 101/18* (2006.01)
*C08G 18/38* (2006.01)

(52) U.S. Cl. .......................... 524/31; 524/35; 524/445; 523/209; 106/618

(58) Field of Classification Search .................. 524/31, 524/35, 445; 523/209; 106/618
See application file for complete search history.

(56) References Cited

U.S. PATENT DOCUMENTS

| | | | |
|---|---|---|---|
| 3,227,675 A | 1/1966 | Papalos | |
| 3,290,165 A | 12/1966 | Iannicelli | |
| 3,567,680 A | 3/1971 | Iannicelli | |
| 3,922,239 A | 11/1975 | Koleske et al. | |
| 4,071,494 A * | 1/1978 | Gaylord | 523/205 |
| 4,529,788 A | 7/1985 | Asami et al. | |
| 4,739,007 A | 4/1988 | Okada et al. | |
| 4,789,403 A | 12/1988 | Rice | |
| 4,810,734 A | 3/1989 | Kawasumi et al. | |
| 4,889,885 A | 12/1989 | Usuki et al. | |
| 5,280,055 A * | 1/1994 | Tomka | 524/47 |
| 5,480,922 A | 1/1996 | Mulhaupt et al. | |
| 5,554,670 A | 9/1996 | Giannelis et al. | |
| 5,925,181 A * | 7/1999 | Cook et al. | 106/170.29 |
| 6,214,907 B1 * | 4/2001 | Tomka | 524/47 |
| 6,506,824 B1 * | 1/2003 | Bastioli et al. | 524/47 |
| 6,838,037 B2 * | 1/2005 | Autran et al. | 264/328.1 |
| 2001/0007676 A1* | 7/2001 | Mui et al. | 424/401 |
| 2002/0098309 A1* | 7/2002 | Bagrodia et al. | 428/36.9 |
| 2005/0191490 A1* | 9/2005 | Ton-That et al. | 428/407 |

FOREIGN PATENT DOCUMENTS

JP 07102114 A * 4/1995

OTHER PUBLICATIONS

Wibowo et al. Abstract for "Solvent-free maleic anhydride grafted cellulose acetate butyrate". Mar. 2004. Retrieved from <http://www.csa.com>.*
Wibowo, A., et al., Polymer Preprint 45(1) 1058 (2004).
Silverstein, R.M., Spectrometric Identification of Organic Compounds; Wiley: New York (1981).
Carlson, D., et al., J. Appl. Polym. Sci., 72 477 (1999).
Lebaron, P.C., et al., Appl. Clay Sci., 15 11 (1999).
Ward, W.J., et al., J. Mem. Sci. 55 173 (1991).
Lan, T., et al., Chem. Mater. 6 573 (1994).
Bruins, P.F., In Plastic Technology; New York Reinhold Publishing Co. Chapman & Hall, Ptf., London, 1, 1-7, 193-199 (1965).
Park, H.M., et al., Macromolecules 37(24)9076-9082 (2004).
Piner, R.D., et al., Langmuir 19 7995 (2003).

* cited by examiner

*Primary Examiner*—Kriellion Sanders
(74) *Attorney, Agent, or Firm*—Ian C. McLeod

(57) ABSTRACT

A polymer composition of cellulose esters, plasticizer, a cellulose linked anhydride as a compatibilizer and organically modified clay. The composites have superior tensile and flexural strengths, modulus, dimensional stability and heat deflection temperature (HDT).

25 Claims, 16 Drawing Sheets

FIG. 6B
FIG. 6D
FIG. 6A
FIG. 6C
FIGURE 6

COMPOSITIONS OF CELLULOSE ESTERS AND LAYERED SILICATES AND PROCESS FOR THE PREPARATION THEREOF

CROSS-REFERENCE TO RELATED APPLICATIONS

This applications claims priority to Provisional Patent Application Ser. No. 60/566,642, filed Apr. 30, 2004.

STATEMENT REGARDING FEDERALLY SPONSORED RESEARCH OR DEVELOPMENT

This application was funded by NSF-2001 TSE ##0124789 and NSF-2002 NER#0210681.

STATEMENT REGARDING GOVERNMENT RIGHTS

Not Applicable

BACKGROUND OF THE INVENTION (1) Field of the Invention

The invention deals with fabrication of biodegradable green cellulose ester nanocomposites from a plasticized cellulose ester bioplastic and various organically modified clays in presence of a novel compatibilizer, such as maleated cellulose ester.

(2) Description of Related Art

Green nanocomposites are the wave of the future and are considered as the next generation of new materials. The lofty goals set by U.S. governments for the creation of bio-based economy present significant challenges to Industry, Academia and Agriculture/Forestry. Cellulose from trees is attracting interest as a substitute for petroleum feedstock in making plastic in the commercial market. Different raw materials such as cotton, recycled paper, wood cellulose, and sugarcane are being used in making cellulose ester biopolymers. Cellulose esters (such as Cellulose acetate or CA, Cellulose acetate propionate or CAP, and cellulose acetate butyrate or CAB) are considered as potentially useful biodegradable polymers of the future.

U.S. Pat. No. 3,922,239 describes a mixture of cellulose esters or ethers which are mixed with polymeric cyclic esters, such as oligomer of .epsilon.-caprolactone. This substance is said to be thermoplastic. It was found that the components of the mixture do not posses satisfactory compatibility. This is shown by the fact that during the thermoplastic processing no homogeneous melt is obtained. To some extent even a de-mixing can be observed during the processing.

GR-A-2 152 944 describes plasticized cellulose acetates which were obtained from the reaction of cellulose acetate having a free hydroxyl group with a cyclic ester, in particular ε-caprolactone, in the presence of a catalyst. The weight ratio of the cellulose acetate to the cyclic ester is said to be between 1/99 and 95/5 and the polymerization temperatures are said to be between 120° and 230° C. The quantity of cyclic ester which is to be reacted with the hydroxyl group-containing cellulose acetate, is preferably between 0.5 and 4.0 mol units per anhydroglucose unit of the cellulose acetate. The melting temperature of the plasticized cellulose acetate is reduced through an "inner" plasticization. The decomposition temperature is simultaneously raised.

U.S. Pat. No. 4,529,788 deals with a process for the production of graft polymerization in which a cyclic ester is subjected to a catalyzed ring-splitting polymerization in the presence of a cellulose derivative.

Polymer-nanocomposites research is primarily concerned with commercial nonbiodegradable thermoplastics like nylon, polypropylene (PP), thermoplastic polyolefin (TPO) and thermosets like epoxies, polyesters, and the like. Biodegradable nanocomposites from starch plastic and clay are known in the literature and such efforts are targeted for packaging applications.

It is also well known in the prior art to heat fillers of the nanocomposite type to provide the polymer matrix to improve the interfacial adhesion of the mineral to the matrix. For example, in Papalos, U.S. Pat. No. 3,227,675, kaolin clays are described, the surfaces of which are modified with organofunctional silanes. Additional references of this type include Iannicelli, U.S. Pat. Nos. 3,290,165 and 3,567,680. Similarly, in U.S. Pat. No. 4,789,403 to Rice and U.S. Pat. No. 6,828,367 to Campbell, a method is disclosed for producing a layered lattice silicate which is surface modified with an organic material. The layered lattice silicate is contacted with an organic monomer, comonomers, or a pre-polymer, and surface polymerization or reaction in situ is affected in the presence of a gaseous hydrogen atmosphere. Among the organic monomers that can be used in the process are various precursors of nylon.

Recently, disclosures in producing composite materials composed of a polymer and a smectite-type clay mineral, with the mineral being connected to the polymer through ionic bonding. For example, in Kawasumi et al., U.S. Pat. No. 4,810,734 a process is disclosed wherein a smectite-type clay mineral is contacted with a swelling agent in the presence of a dispersion medium thereby forming a complex. The patent states that the swelling agent acts to expand the interlayer distance of the clay mineral, thereby permitting the clay mineral to take monomers into the interlayer space. The swelling agent is a compound having an onium ion and a functional ion capable of reacting and bonding with a polymer compound. Examples of polymers used in this system are polyamide resins, vinyl polymers, thermosetting resins, polyester resins, polyamide resins and the like. Related disclosures are found in U.S. Pat. No. 4,739,007 to Okada et al and U.S. Pat. No. 4,889,885 to Usuki et al.

U.S. Pat. No. 5,480,922 to Mulhaupt et al; U.S. Pat. No. 3,922,239 to Koleske et al., U.S. Pat. No. 4,529,788 to Asami et al, U.S. Pat. No. 5,554,670 to Giaannelis et al.

There are three common processes for fabricating polymer-clay nanocomposites. They are melt compounding; solution processing; and in-situ intercalation polymerization. In the usual melt compounding technique the polymer pellets and clay are extruded to derive the polymer-clay nanocomposites. For uniform mixing of clay and polymer granules; both the clay and the polymer are sometimes extruded twice. The extruded samples are further injection molded or compression molded to provide the test specimens.

Phthalate plasticizers, used in commercial cellulose acetate plastic, pose an environmental and perhaps a health threat and thus it is a serious concern about their long-term use. Plasticized CA is a potentially useful biodegradable polymer of the future with considerable toughness, excellent optical clarity. It has, however, low dimensional stability under high humidity and elevated temperature, and high melt processing temperature. Therefore, the flow properties are low for automotive and packaging applications. Improvement of flow properties of CA or CAB can be done through plasticization using plasticizer like phthalates or glycerol. Unfortunately, the existence plasticizer migration greatly decreased mechanical properties.

OBJECTS

An object of the present invention is to provide novel biodegradable cellulose ester nanocomposites made by melt compounding cellulose acetate, plasticizer, organoclay, and compatibilizer simultaneously. A further object is to provide an economically feasible process for the production of biodegradable plasticized cellulose ester nanocomposite. These and other objects will become increasingly apparent by reference to the following description.

SUMMARY OF THE INVENTION

The present invention relates to a polymer composition which comprises a melt compounding mixture which comprises: (a) a cellulose ester as a matrix for the composition; (b) an organically modified layered clay; and (c) a synthesized compatibilizer comprising cellulose linked to an anhydride group which reacts with the cellulose ester and the clay.

Preferably the cellulose ester is cellulose acetate. Preferably the cellulose ester is cellulose acetate butyrate. Preferably the cellulose ester is cellulose acetate propionate. Preferably the cellulose ester has a degree of substitution of between about 1.20 and 2.95 and a degree of polymerization between about 150 and 300. Preferably the plasticizing agent is an organic ester. Preferably the plasticizing agent is selected from the group consisting of triethylcitrate and bis(2-ethylbenzyl)adipate. Preferably the weight ratio of plasticizing agent to cellulose ester is between about 10 to 90 and 40 to 60. Preferably the organically modified clay is present in an amount between about 1 and 20% by weight. Preferably the clay is a smectite clay. Preferably the clay is a cationically onium ion modified clay. Preferably the onium anion is selected from the group consisting of bis(2-hydroxymethyl) tallow ammonium and bis-2-hydroxyethyl hydrogenated tallow. Preferably the anhydride group is a maleic anhydride derived group.

The present invention also relates to a process for preparing a polymer composition which comprises melt compounding of cellulose ester matrix, a plasticizing agent, organically modified layered clay, and a synthesized compatibilizer comprising cellulose linked to an anhydride group which reacts with the clay and the cellulose ester.

Preferably before the melt compound, the cellulose ester and plasticizer are mixed together. Preferably the premixing is for 1 minute to 4 hours. Preferably dispersing of the clay into the cellulose ester matrix is carried out by mixing the clay and a pre-plasticized CE at temperatures in the range of 150 to 250° C., followed by melt compounding for 1 to 20 minutes. Preferably the anhydride group is maleic anhydride linked to a second cellulose ester. Preferably the maleic anhydride comprises 0.1 to 20% by weight of the modified compatibilizer which has a grafted MA contents which are 0.1-20 wt %. Preferably synthesized compatibilizer is added in a weight content of 0.5 to 30 wt % of the composition. Preferably the compatibilizer is mixed with cellulose ester and clay which have been premixed before the melt compounding and then fed to an extruder. Preferably the melt compounding is for 1 minute up to 1 hour.

Preferably the plasticized cellulose ester nanocomposites have tensile and flexible strength between 20 and 130 MPa, tensile and flexible modulus between 1 and 8 GPa and a modulus between 1 and 8 GPa, and a tensile stretch between 1 and 50%.

Preferably the plasticized cellulose ester nanocomposites have an impact strength between 20 and 200 J/M and a coefficient of thermal expansion (CTE) between 70 and 150 (um/m° C.). Preferably the plasticized cellulose ester nanocomposites have an oxygen gas permeability between 100 and 300 (cc-mil/[100 in$^2$-day.atm] and water vapor permeability between 40 and 90 (gm-mil/[100 in$^2$-day.in$^2$Hg]). Preferably the plasticized cellulose ester nanocomposites have a heat deflection temperature (HDT) between 90 and 130° C.

This invention targets thus can replace or substitute petroleum derived polypropylene/TPO (thermoplastic olefin) based nanocomposites by providing compatibilized clay reinforced cellulosic bioplastics made through a novel approach particularly for automotive and electronics goods applications. These can replace fossil-derived nonbiodegradable polymers.

In the processing the cellulose ester polymer is preferably used in powder form instead of usual cellulose ester pellets or granules. Powder-powder mixing imparts better exfoliation of the organoclay. The cellulose esters are thermoplastic materials which are produced through esterification of cellulose from plants. The cellulose acetates produced have mainly been in the form of white powders. In the past, cellulose acetate (CA) or cellulose acetate butyrate (CAB) powders in the presence of phthalate plasticizer and other additives are extruded to produce various grades of commercial cellulosic plastics in granulated form and are readily available.

The polymer-layered Silicate Nanocomposites (PLS) are mixed in a plasticized CA system to overcome migration of the plasticizer. PLS exhibits improved properties such as modulus, barrier property, solvent and heat resistance, flame retardency and so on. To overcome the drawbacks of CA or CAB, PLS and environmentally friendly plasticizer are used to maintain a balance of strength and toughness with easy processability, negligible water absorption, and fairly low coefficient of thermal expansion.

In the nanocomposite fabrication process, powdered cellulose acetate can be premixed with powdered clay. The main drawback of cellulose acetate polymers is that its melt processing temperature exceeds its thermal decomposition temperature. This implies that cellulose acetates should be plasticized if they are to be used in thermoplastic applications. An environmentally friendly plasticizer (triethyl citrate or blends of citrate and derivatized vegetable oil) is used to improve the processability of cellulose acetate plastic.

The present invention provides green nanocomposites which comprise cellulose acetate plastic+Clay+Maleated Cellulose acetate (compatibilizer) through novel processing. The clay content and compatibilizer content including the extent of maleation and its effect on interface are process variables in the nanocomposites. The goal is to maintain a balance of strength and toughness with additional benefits of negligible water absorption and a much-improved coefficient of thermal expansion of the targeted green nanocomposites through nanoreinforcement.

The interrelated aspects of this invention include (i) synthesis and characterization of maleated cellulosic plastic compatibilizer through a reactive extrusion process (ii) formulation of a plasticized cellulosic bio-plastic with acceptable mechanical properties by research into citrate as well as vegetable oil-based plasticizer; and (iii) an integrated process scheme for green nanocomposites utilizing a "cascade engineering principle" i.e., adoption of reduced number of steps in manufacturing.

The present invention provides for structural applications from cellulosic plastics through right choice of materials. Cellulosic plastic-based nanocomposites show performance comparable to PP/TPO based nanocomposites, if the correct plasticizer and processing conditions are selected. Compatibilization between nanoclay and cellulosic bioplastic is important. A new maleated compatibilizer is developed to effectively bind both the clay and cellulosic bioplastic in the compatibilized green nanocomposites. Through a synergistic blend of materials with a novel processing approach, a new generation of green and eco-friendly nanocomposites is provided.

Compatibilized clay reinforced cellulosic bioplastic are useful, particularly for automotive and electronics goods applications. Cellulose esters (such as Cellulose acetate or CA, Cellulose acetate propionate or CAP, and cellulose acetate butyrate or CAB) are useful biodegradable polymers. The present invention provides structural applications of cellulosic plastics through the right choice of materials.

The maleated compatibilizer is provided to effectively bind both the clay and cellulosic bioplastic in the compatibilized green nanocomposites. Through a synergistic blend of materials with a novel processing approach, a new generation of green and eco-friendly nanocomposites is provided. The invented green nanocomposites from cellulose ester are targeted for high strength structural applications such as in the automotives and electronic goods applications. Injection molded 'green' nanocomposites were successfully fabricated from cellulose acetate (CA), triethyl citrate (TEC) plasticizer, a maleated compatibilizer and organically modified clay. The effects of processing conditions, amount of plasticizer, various types and content of organoclays, and compatibilizer, preferably maleic anhydride grafted cellulose acetate butyrate (CAB-g-MA), on the performance of these nanocomposites have been evaluated. Cellulosic plastic compositions with 60-85 wt. % pure cellulose acetate and 40-15 wt. % triethyl citrate plasticizer were used as the polymer matrix for nanocomposite fabrication. The tensile strength and modulus, and thermal stability of the CA nanocomposite with compatibilizer were improved, but the impact strength decreased. CA nanocomposites show superior tensile & flexural strength and modulus, better dimension stability & HDT rather than polypropylene (PP) nanocomposites. CA/PP (plasticizing agent)/organoclay/compatibilizer blend nanocomposites are of higher elongation at break, better barrier (water vapor and oxygen gas) and better processability in terms of extruding & injection molding rather than CA nanocomposites.

In particular injection molded 'green' nanocomposites have been successfully fabricated from cellulose acetate (CA), triethyl citrate (TEC) plasticizer, a maleated compatibilizer and organically modified clay. The effects of processing conditions, amount of plasticizer, various types and content of organoclays, and compatibilizer, maleic anhydride grafted cellulose acetate butyrate (CAB-g-MA), on the performance of these nanocomposites have been evaluated. Cellulosic plastic compositions with 60-85 wt. % pure cellulose acetate and 15-40 wt. % triethyl citrate plasticizer were used as the polymer matrix for nanocomposite fabrication. The tensile strength and modulus, and thermal stability of the CA nanocomposite with compatibilizer were improved, but the impact strength decreased. CA nanocomposites show superior tensile and flexural strength and modulus, better dimension stability and heat deflection temperature (HDT) rather than polypropylene (PP) nanocomposites. CA/PP/organoclay/compatibilizer blend nanocomposites are of higher elongation at break, better barrier (water vapor and oxygen gas) and better processibility in terms of extruding and injection molding rather than CA nanocomposites.

DESCRIPTION OF DRAWINGS

FIGS. 6A to 6D are TEM micrographs of the CA/TEC (80/20 wt. %)/clay hybrid nanocomposites with different organoclay types at fixed clay 5 wt. %: a) CLOISITE 30B; b) TCA; C) TCN; d) 44PA.

In FIG. 13A, scan size is 1.5 μm; the arrow labeled the magnified image of the clay aggregate. In FIG. 13B, magnified image of the layer structure of clay aggregate. Scan size 150 nm.

FIG. 15A is without compatibilizer, 100 kV, FIG. 15D is intercalated part of without compatibilizer, high magnification, 200 kV. FIG. 15C is exfoliated part of with compatibilizer 5 wt.-%, 200 kV.

(compatibilizer—CAB-g-MA 5 wt. %, Organoclay—CLOISITE 30B 5 wt. %); PP: (compatibilizer: PP-g-MA 10 wt. %, organoclay-Nanomer I.30P 5 wt. %).

DESCRIPTION OF PREFERRED EMBODIMENTS

Figure 2:
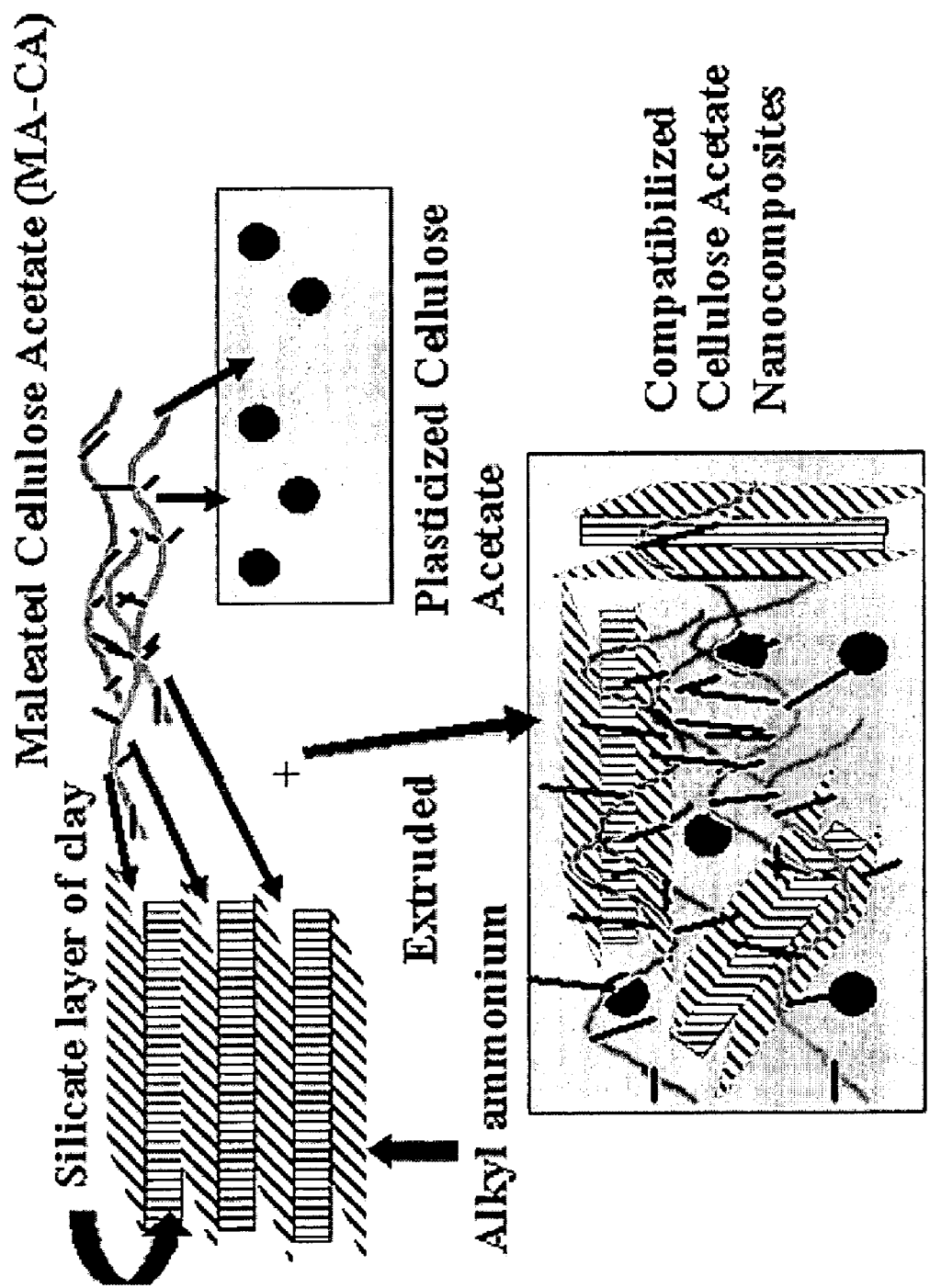
FIG. 2 is a schematic representation: mechanism of compatibilized CA/TEC/Organoclay hybrid nanocomposites.

As the number of processing steps required to process a material increases, the more cost will be added to the finished product. Reduction in the processing complexity also makes for more Greener technology—known as "Cascade Engineering Principle". One of the major targets of this invention is to adopt a reduced number of steps in designing the green nanocomposites. The cellulose acetate powder being mixed with clay powder, maleated compatibilizer and liquid plasticizer are fed into the extruder. In the prior art, cellulose acetate powder along with plasticizer and additives are extruded to make commercial cellulose plastic pellets. In the present invention, the cellulose acetate powder is used and thus avoiding one step of extrusion. Another advantage of this processing is achieved thorough mechanical mixing of matrix polymer and clay before extruding in presence of compatibilizer and liquid plasticizer. The schematic representation of the process for preparing green nanocomposite pellets (to be further injection molded to make test bars) from cellulose acetate powder (micron size), clay particles, liquid plasticizer (citrate/citrate+epoxidized vegetable oil), maleated cellulose acetate butyrate (powder form, prepared previously through reactive extrusion) is depicted in FIG. 2. This processing approach is a unique aspect of this invention. The cellulose acetate powder, clay, and maleated cellulose acetate butyrate compatibilizer are mechanically mixed and are fed through the powder feeder, whereas liquid plasticizer is fed through a pump into the extruder. The extrudate pellets are injection molded into test specimens.

Compatibilization Mechanism

In this invention organically modified montmorillonite commercial clay was used (methyl dihydroxyethyl hydrogenated tallow ammonium modified) i.e. Nanocor 1.34 TCA or CLOISITE 30B clay. Further modification of clay is avoided under this invention. Through maleated cellulose ester compatibilizer the improved adhesion of clay and cellulosic bioplastic is produced here. In comparison to maleated polypropylene (MAPP) for clay-PP nanocomposites, the maleated cellulose ester is more efficient because cellulose ester is polar while PP is nonpolar. In the case of cellulose ester-clay nanocomposites the maleated cellulose ester enters into clay gallery and also reacts with the free —OH group of the cellulose ester and clay thus improving the overall compatibilization of the entire system. The proposed reaction mechanism of compatibilization is schematically represented in FIG. 2.

EXAMPLES

Cellulose acetate, CA (CA-398-30, acetyl 39.7 wt. %, hydroxyl 3.5 wt. %) and cellulose acetate butyrate (see scheme 1), CAB (CAB-381-20, butyryl 37 wt. %, acetyl 13.5 wt %, hydroxyl 1.8 wt %) without additives in powder form and triethyl citrate (TEC, CITROFLEX 2, see scheme 2)) were supplied by Eastman Chemical Co. (Kingsport, Tenn.) and Morflex, Inc, (Greensboro, N.C.) respectively. The biodegradability of CA depend on the degree of substitution, the degree of substitution of cellulose acetate (CA) is approximately 2.45. Therefore, CA is a long term biodegradable polymer. One organically modified montmorillonite (organoclay) (CLOISITE 30B) was purchased from Southern Clay Co., and three other organoclays (Nanomer I.34TCN, I.34TCA, and 1.44PA) were provided by Nanocor Co. IL. The ammonium cation of CLOISITE 30B, is methyl tallow bis-2-hydroxyethyl quaternary ammonium (see scheme 3). The cation in I.34TCNI.34TCA is, methyl tallow bis-2-hydroxyethyl hydrogenated-tallow ammonium, where as in I.44PA, the cation is dimethyl dialkyl ($C_{14-18}$) ammonium. Nanomer I.30P is Octadecyl amine modified montmorillonite. CLOISITE 30B, I.34TCN and I.34 TCA clay have free OH group but I.44PA clay has no free OH group in the organic modifier of organoclay. Chemical structures of cellulose ester, TEC plasticizer and organic modifier of CLOISITE 30B are shown in scheme 1, 2 and 3 respectively. Maleic anhydride (99%, MA), liquid initiator, (2,5-dimethyl-2,5-di(t-butylperoxy) hexane (LUPEROX 101)), acetone, and 0.1011 N methanolic KOH were purchased from the Aldrich Chemical Co. PP homopolymer powder obtained from BASELL PRO-FAX 6301 with MI=12 g/10 min and specific gravity of 0.9.

Scheme 1.

Cellulose esters

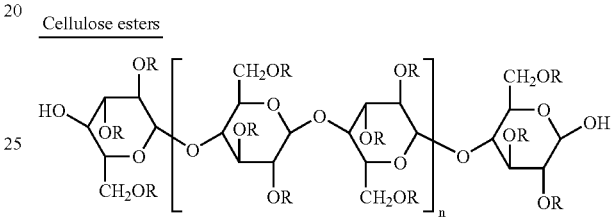

Structure of Cellulose esters (Cellulosic Plastics): R = H (Cellulose), acetyl (Cellulose acetate), acetyl and propionyl (Cellulose acetate propionate), or acetyl and butyryl (Cellulose acetate butyrate)

Scheme 2. Chemical structure of TEC.

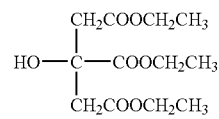

Scheme 3. Chemical structure of organic modifier of CLOISITE

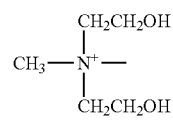

Full List of chemicals, solvents and polymers, fibers etc including sources (that are use in different examples).

Chemicals:
  Maleic anhydride (99%, MA), the Aldrich Chemical Co.
  2,5-dimethyl-2,5-di(t-butylperoxy) hexane (LUPEROX 101), liquid initiator
  0.1011 N methanolic KOH, the Aldrich Chemical Co.

Solvents:
  Acetone, the Aldrich Chemical Co.
  Triethyl citrate (TEC, CITROFLEX 2, see scheme 2)), and Morflex, Inc, (Greensboro, N.C.).

Polymers:
  Cellulose acetate, CA (CA-398-30, acetyl 39.7 wt. %, hydroxyl 3.5 wt. %), Eastman Chemical Co. (Kingsport, Tenn.), the degree of substitution of cellulose acetate (CA) is approximately 2.45.

Cellulose acetate butyrate, CAB (CAB-381-20, butyryl 37 wt. %, acetyl 13.5 wt. %, hydroxyl 1.8 wt. %) without additives in powder form, Eastman Chemical Co. (Kingsport, Tenn.) Polypropylene (PP) homopolymer powder obtained from Basell Pro-Fax 6301 with MI=12 g/10 min and specific gravity of 0.9.

Fillers:

Organically modified montmorillonite (organoclay):
CLOISITE 30B, Southern Clay Co., the ammonium cation of CLOISITE 30B, is methyl tallow bis-2-hydroxyethyl quaternary ammonium.
Nanomer I.34TCA, Nanocor Co. IL), The cation is methyl tallow bis-2-hydroxyethyl hydrogenated-tallow ammonium,
Nanomer I.34TCA, Nanocor Co. IL), The cation is methyl tallow bis-2-hydroxyethyl hydrogenated-tallow ammonium,
Nanomer I.44PA, the cation is dimethyl dialkyl ($C_{14-18}$) ammonium.
Nanomer I.30P is Octadecyl amine modified montmorillonite. Synthesis and Characterization of Compatibilizer (Maleated Cellulose ester: CAB-g-MA):

this invention is cellulose ester. The maleated cellulose acetate butyrate (CAB-g-MA) is synthesized through reactive extrusion using free-radical polymerization. A free-radical peroxide initiator [2,5-dimethyl-2,5-di-(t-butyl peroxy) hexane] is chosen to initiate the grafting reaction. Peroxide initiator (R—O—O—R) splits into free radicals (RO.), which initiate the graft co-polymerization (see Scheme 4). Through alcoholic KOH titration, the percentage of grafting is determined (Wibowo, A., et al., *Polymer Preprint* 45(1) 1058 (2004)).

CAB-g-MA was synthesized by radical graft polymerization of MA monomer onto CAB backbone polymer and was characterized (Wibowo, A., et al., *Polymer Preprint* 45(1) 1058 (2004)). The extrusion process using DSM Micro 15 cc compounder, DSM research, Netherlands, was adopted in synthesizing solvent free MA-g-CAB. The mixture of CAB, MA (both in powder form), and LUPEROX 101 was fed into DSM micro extruder with following conditions: temperatures between 195 to 205° C., screw speed was 100 rpm, cycle time was 3 minutes. Thin strand extrudate was collected and pelletized into granules. The result granules were vacuum dried at 80 to 90° C. for 24 hrs to remove unreacted Scheme 4.

I. Initiation

R—O—O—R $\xrightarrow{\Delta}$ R—O•

II. Propagation + Termination

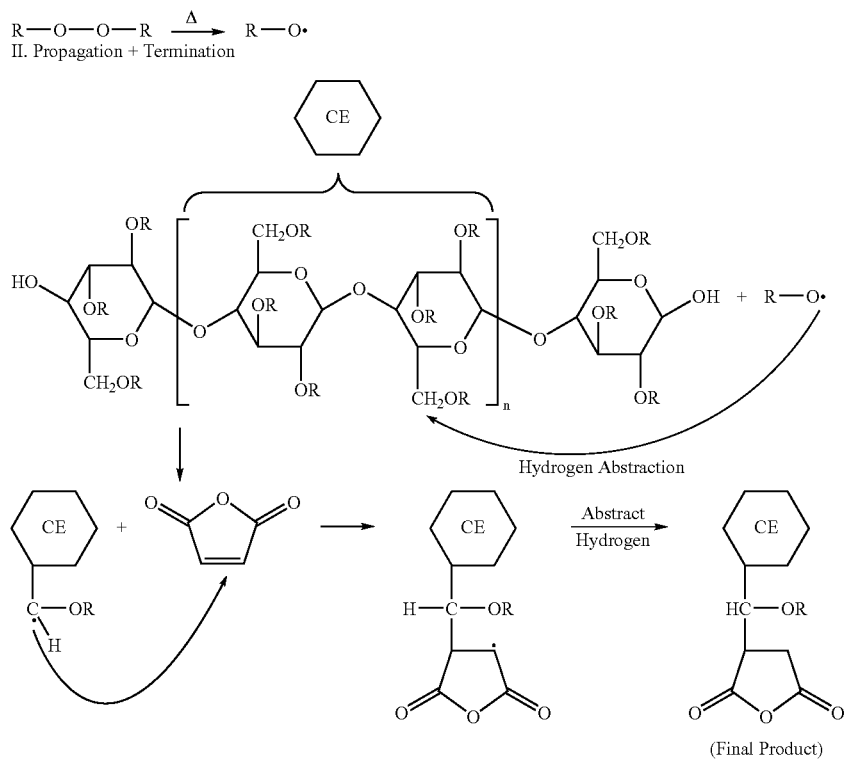

Proposed mechanism of maleic anhydride grafted onto cellulose acetate butyrate (CAB-g-MA).

Figure 1:
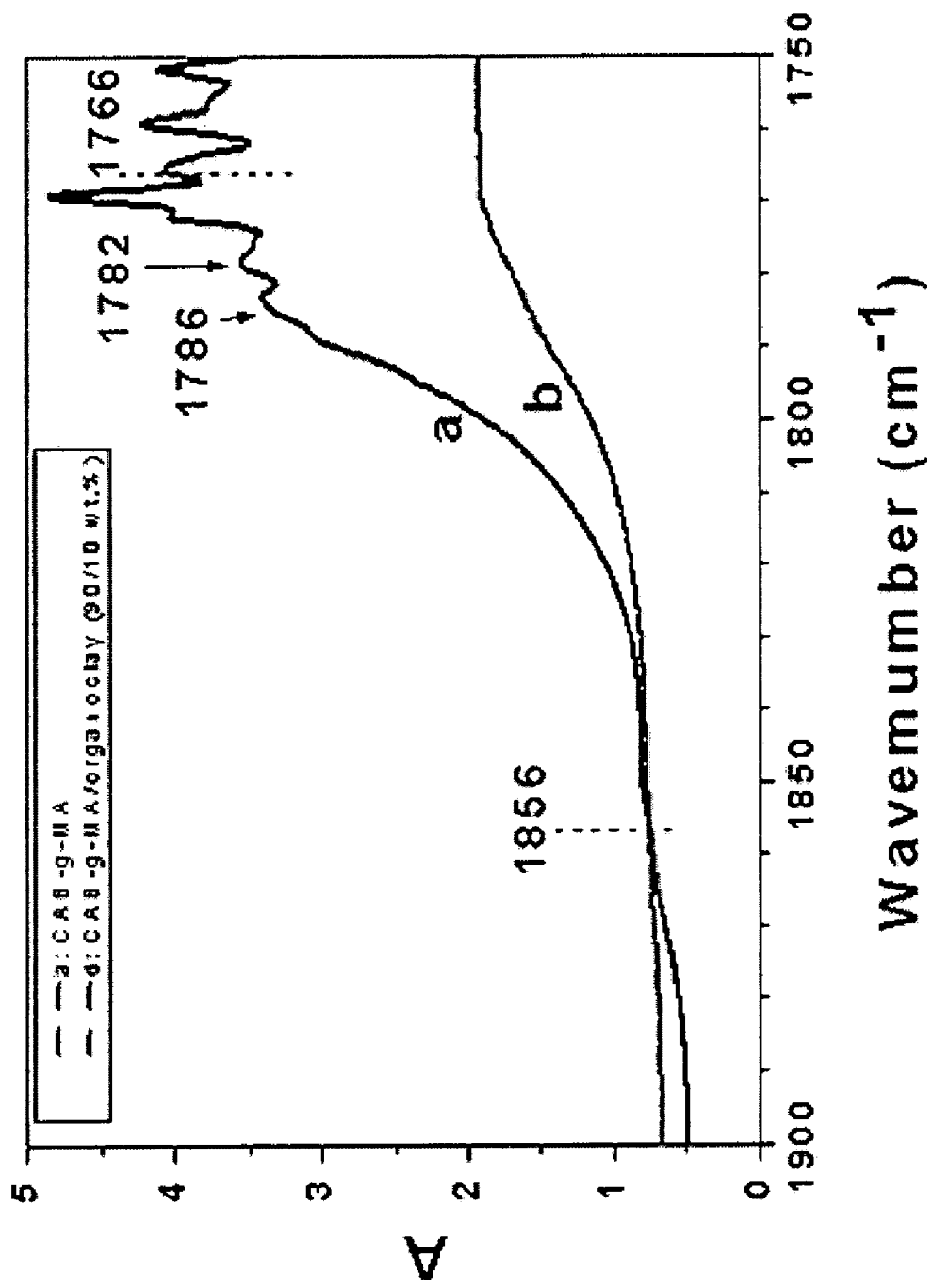
FIG. 1 is a graph of FTIR analysis of compatibilizer CAB-g-MA and CA/CAB-g-MA/organoclay nanocomposites: a) CAB-g-MA (MA 0.8 wt.-% grafted), b) CAB-g-MA/organoclay nanocomposites (90/10 wt.-%) (Note: 1766 $cm^{-1}$ is C=O of CAB, 1786, 1782 $cm^{-1}$ is C=O of MA).

Not only do the clay particles have to be dispersed in the polymer matrix in nanocomposites, but also the adhesion between clay and cellulosic plastic must be optimized for both strength and toughness requirements. The molecular weight, extent of maleation of coupling agents all play a vital role to create efficient compatibilization. The matrix in maleic anhydride. In FIG. 1, melt cast thin film samples were used in differentiating carbonyl groups of neat CAB to that of MA. Hence, carbonyl groups, which belong to MA were assigned to hump around 1786-1782 $cm^{-1}$ whereas peak corresponding to carbonyl groups of neat CAB was assigned at 1766 $cm^{-1}$, carbonyl groups of neat CA was assigned at 1731 cm$^{-1}$ (peak was not shown here). Silverstein et al. report that the IR spectra of the grafted product of grafting MA to the ester show bands at the following positions: 1788 cm$^{-1}$ corresponding to the symmetric C=O stretch of a saturated cyclic five membered anhydride (Silverstein, R. M., *Spectrometric Identification of Organic Compounds*; Wiley: New York (1981)).

The rest of vacuum dried CAB-g-MA was used for quantitative CAB-g-MA characterization by acid base titration, i.e. to determine acid number (AN) and percentage MA grafting (wt.-% MA). The method adopted by Carlson et al (Carlson, D., et al., *J. Appl. Polym. Sci.*, 72 477 (1999)) was modified in characterizing CAB-G-MA by acid base titration. The calculated acid number and grafting percentage (MA wt.-%) were 18.6 and 0.86 wt.-%, respectively (see detail method (Wibowo, A., et al., *Polymer Preprint* 45(1) 1058 (2004))).

Melt Compounding: The CA and clay were dried under vacuum at 80° C. for at least 24 hrs before use. The CA powder and TEC plasticizer (CA: TEC=85:15~60/40 by wt. %) were mixed mechanically with a high speed mixer for about 5 min, and then stored in zip-lock bags for specific time periods. These pre-plasticized mixtures were then mixed with the desired quantity of organoclays followed by mixing with the high-speed mixer. The mixtures (CA+TEC+ organoclay+/−compatibilizer) were melt compounded at 160-220° C. for 2-20 minute at 100 rpm with micro-compounding molding equipment, DSM Micro 15 cc compounder, DSM research, Netherlands (mini extruder with injection molder) e.g. twin screw extruder system. The mini extruder is equipped with a screw having a length of 150 mm, L/D 18, net capacity 15 cm$^3$. After extrusion, the melted hybrid samples were transferred through a preheated cylinder to the mini injection molder (pre-set with desired temperature and cooling system) to obtain the desired sample specimens for various measurements and analysis. The injection-molded samples (virgin plasticized cellulose acetate polymer and nanocomposites) were placed in tightly sealed polyethylene bags to prevent any moisture absorption prior to property determinations.

The invention will be explained in further detail in the following in conjunction with various examples as well as comparison examples and test reports of the physical properties of various tested substances:

Characterization of Nanocomposite

XRD studies of the samples were carried out using a Rigaku 200B X-ray diffractometer (45 kV, 100 mA) equipped with CuKα radiation (λ=0.154 nm) and a curved graphite crystal monochromator at a scanning rate of 0.5°/min. A transmission electron microscope (TEM) (Jeol 100CX, and 2010F) was used to analyze the morphology of nanocomposites at an acceleration voltage of 100 kV for 100CX and 200 kV for 2010F. Microtomed ultra thin film specimens with thickness of 70 nm were used for TEM observation. Fourier transform infrared spectrum (FTIR, Perkin Elmer system 2000 Spectrometer) was measured using melt cast thin film.

A dynamic mechanical analyzer (2980 DMA, TA instruments, USA) was used to measure the heat deflection temperature (HDT) of nanocomposites (hybrids) with a load of 66 psi according to ASTM D648 and the dynamic storage modulus (E'), loss modulus (E") and mechanical loss tangent (tan δ=E"/E'). The injection-molded samples were cut to the desired shape for the DMA measurements. During the E', E", and tan delta measurements the single cantilever mode at frequency of 1 Hz, amplitude of 30 μm, scan rate of 4° C./min and the temperature range of 25 to 170° C. was used. Tensile properties and flexural properties of injection molded specimens were measured with a United Testing System SFM-20 according to ASTM D638 and ASTM D790 respectively. System control and data analysis were performed using Datum software. Notched Izod impact strength was measured with a Testing Machines Inc. 43-02-01 Monitor/Impact machine according to ASTM D256 with a 1 ft-lb pendulum. Thermo-gravimetric analysis (TGA) was performed using a TA 2950, TA instruments, USA at a heating rate of 10° C./min under nitrogen atmosphere. Water vapor and oxygen permeability (Minneapolis, Minn.) experiments of virgin cellulosic plastic and nanocomposites were also conducted with Mocon Permatran-W Model 3/33 and OX-TRAN Model 2/21. The injection-molded specimens were kept in a controlled humidity and temperature chamber, i.e. 30° C., 90±2% of relative humidity for various time intervals. The amount of absorbed water vapor was calculated from the specimen weight increase. AFM imaging was conducted using a Nanoscope IV atomic force microscope from Digital Instruments (Santa Barbara, Calif.) equipped with an E scanner. Samples were mounted onto a stainless steel disk using a sticky tab (Latham, N.Y.). The microscope was allowed to thermally equilibrate for thirty minutes before imaging. Scanning rates less than 1 Hz were used. Room temperature was maintained at 22±1° C. Images were recorded in tapping mode using etched silicon probes (Digital Instruments). The samples are cross, plane, and 45° titled cross-sectioned with by a diamond knife at room temperature. The cross section surface was polished with 4000# grit from until a smooth surface was obtained.

Example 1

Sequential Mixing Methods and Pre-Plasticization

The CA and clay were dried under vacuum at 80° C. for at least 24 hours before use. The CA powder and TEC plasticizer (CA/TEC=80/20 by wt. %) were mixed mechanically with a high speed mixer for about 5 min and CA pre-plasticized mixture was stored in zip-lock bags for 20, 40, and 75 minutes. These pre-plasticized mixtures were then mixed with 5 wt % of organoclays followed by mixing with the high-speed mixer. These mixtures (CA+TEC+ Organoclay) were then melt compounded at 200-220° C. for 6 minute at 100 rpm with the DSM micro-compounding equipment.

Figures 3A, 3B, 3C:
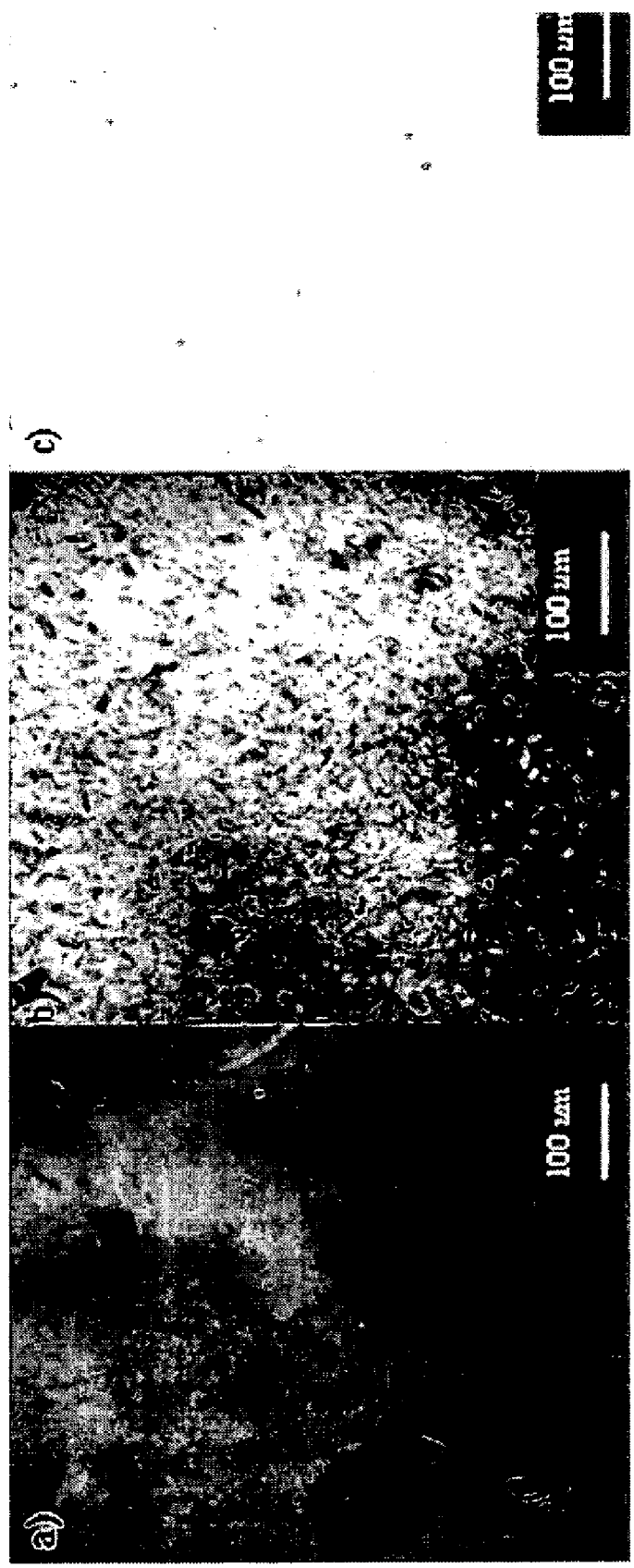
FIGS. 3A, 3B and 3C are microscope photos of the CA/TEC/clay hybrid nanocomposites with different the sequential processing methods: a) CA/TEC plasticized pellet+clay mixing, b) CA/TEC melting+clay mixing, c) pre-plasticized CA/TEC powder+clay mixing;–80×.

FIGS. 3A, 3B and 3C show the micrographs of different sequential mixing methods for CA powder, clay, and non-solvent type plasticizer TEC for homogeneous clay dispersion hybrid nanocomposites. FIG. 3A shows an optical microscope image of the plasticized CA/TEC pellets mixed with clay and then melt compounded. FIG. 3B shows the results of addition of clay powder while melting the CA/TEC powder, followed by continued melt compounding in the extruder. These two conventional methods result in non-transparent composites due to aggregated or poorly dispersed clay in the matrix (see FIGS. 3A and 3B). FIG. 3C shows the optical microscope image of our original hybrid powder-powder mixing method, i.e., powdered form of cellulose acetate was pre-plasticized by the addition of TEC, and then the organoclay powder was added, followed by melt compounding in the extruder. Such a hybrid powder-powder mixing method produced the best dispersion of clay, which resulted in a very homogeneous dispersion and with excellent exfoliation of the clay.

In the pre-plasticization, the penetration time of TEC plasticizer into CA powder and the melt compounding are important parameters for plasticizing CA/TEC plastic. In Table 1 the effect of the sequential mixing method and pre-plasticizing time on the flexural properties of these hybrid nanocomposites is shown. The hybrid powder-powder mixing process produces good flexural strength and modulus. This mixing method is used to prepare the following powder-powder systems.

TABLE 1

Flexural properties of the plasticized CA/clay hybrid nanocomposites with different sequential mixing method

| Sample No | Sequential mixing Methods | Pre-plasticizing time (min.) | Clay contents (Wt %) | Flexural Strength (MPa) | Flexural Modulus (GPa) |
|---|---|---|---|---|---|
| A | CA/TEC plasticized pellet + clay powder | 75 | 5 | 94 ± 2.2 | 4.00 ± 0.1 |
| B | CA/TEC melting + clay powder | 75 | 5 | 93 ± 0.7 | 4.08 ± 0.1 |
| c | CA/TEC pre-plasticized powder + clay powder | 75 | 5 | 98 ± 3.0 | 4.10 ± 0.5 |
| d | | 75 | 0 | 84 ± 4.4 | 3.00 ± 0.3 |

Example 2

Pre-Plasticizing Methods

Figure 4:
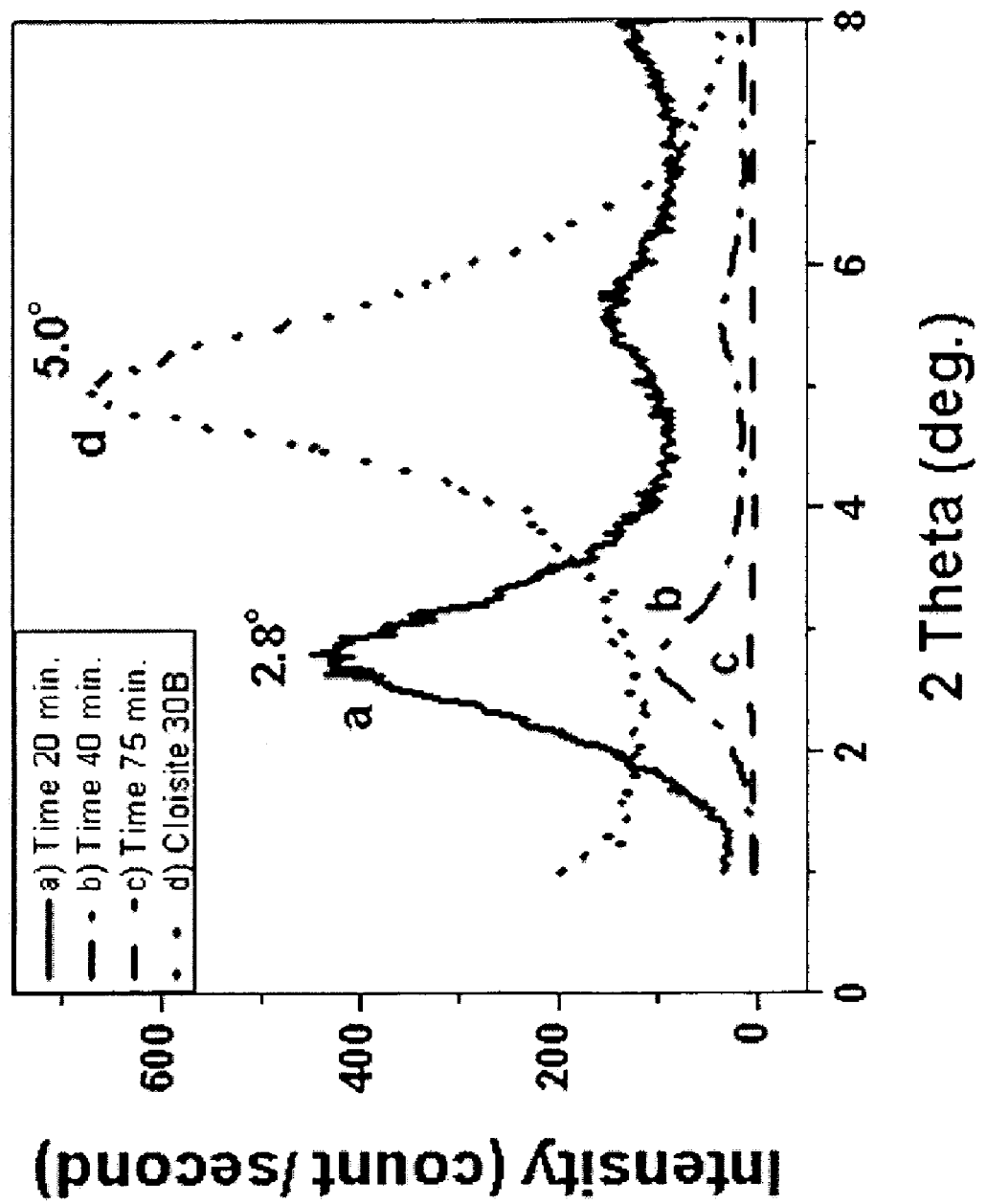
FIG. 4 is a graph showing XRD diffraction patterns of CA/TEC (=80/20.wt. %)/Clay hybrid nanocomposites with different the pre-plasticizing times at Clay 5 wt %: a) 20 min, b) 40 min, c) 75 min, d) CLOISITE 30B.

Microstructure of Nanocomposites: FIGS. 4A, 4B and 4C show the XRD patterns of pure CLOISITE 30B clay and CA/TEC/CLOISITE 30B nanocomposites after different pre-plasticizing times. The XRD peak shifted from 5.00 for pure CLOISITE 30B to 2.8° for 20 minute and 40 minute pre-plasticized CA/TEC CLOISITE 30B nanocomposites (FIGS. 4A and 4B). This indicates significant intercalation and slight exfoliation. For CA/TEC/CLOISITE 30B nanocomposite after 75-minute pre-plasticizing times (FIG. 4C), no clear peak was observed at 2.8°, suggesting complete exfoliation of organoclays in the CA/TEC matrix. In the XRD curves, approximately 75 minute of penetration times is required for the CA/TEC/clay nanocomposites to be almost completely exfoliated.

Mechanical Properties: Table 2 shows typical flexural properties of the CA/TEC/CLOISITE 30B hybrids with different pre-plasticizing times. The flexural strength and modulus of the CA/TEC/organoclay hybrids increased with increasing pre-plasticizing time. An optimal penetration time is need for the nonsolvent plasticizer TEC to migrate into and in between the rigid CA molecular chain making CA plastic flexible and soft. The above results indicate that the good exfoliation and dispersion of clay in the CA/TEC matrix gives good mechanical properties.

TABLE 2

Flexural properties of the CA/TEC/clay hybrid nanocomposites with different pre-plasticizing times

| Sample No | Sequential mixing Method | Clay content (Wt %) | Pre-plasticizing time (min.) | Flexural Strength (MPa) | Flexural Modulus (GPa) |
|---|---|---|---|---|---|
| a | CA/TEC pre-plasticized powder + clay powder | 0 | 75 | 84 ± 4.4 | 3.00 ± 0.3 |
| b | | 5 | 20 | 93 ± 3.0 | 3.75 ± 0.4 |
| c | | 5 | 40 | 95 ± 2.1 | 3.89 ± 0.6 |
| d | | 5 | 75 | 98 ± 3.0 | 4.10 ± 0.5 |

Example 3

Organoclay Type

Figure 5B:
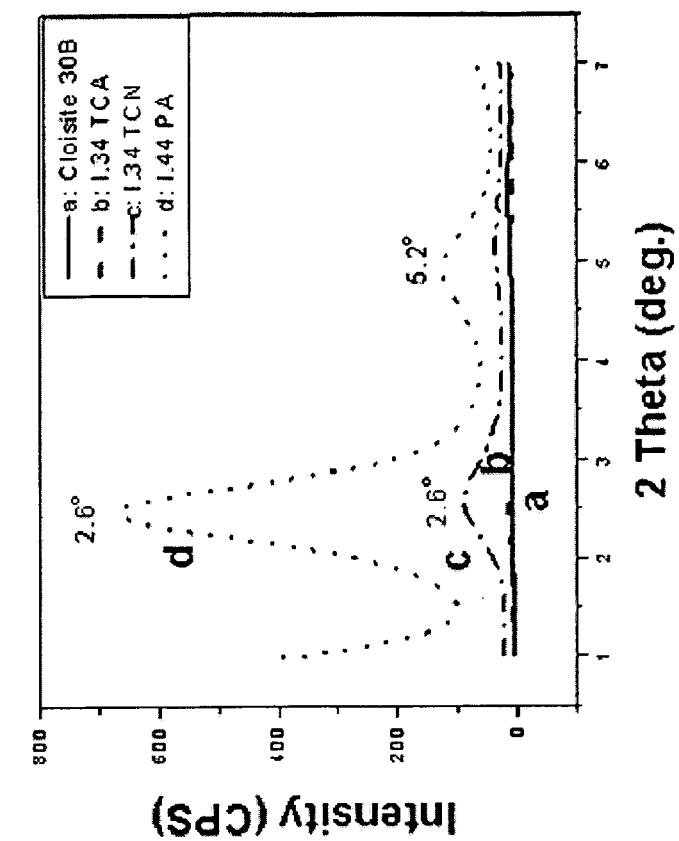
FIG. 5B is a graph of XRD diffraction patterns of CA/TEC (=80/20 wt. %)/Clay hybrid composites at Clay 5 wt. %, compounding-220° C.
Figure 5A:
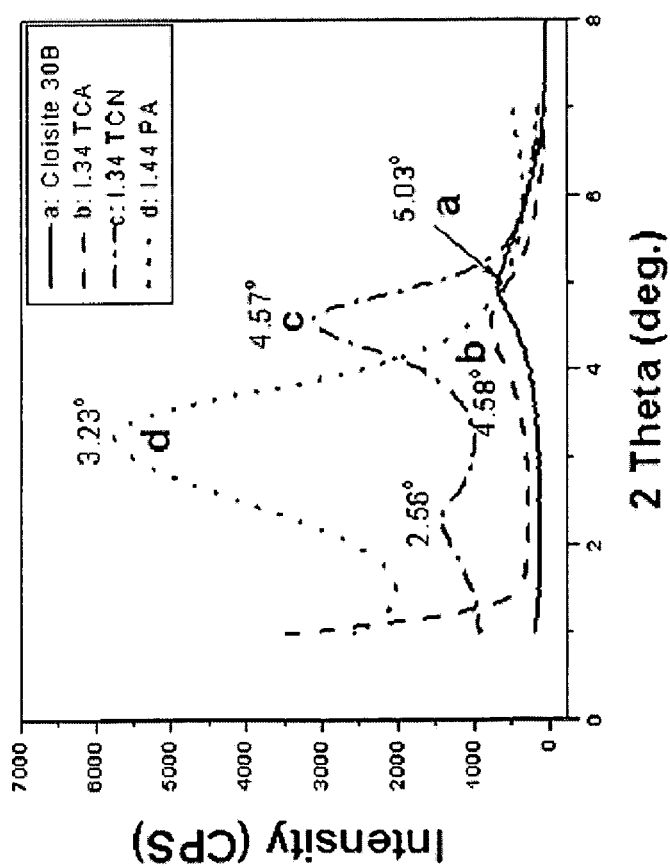
FIG. 5A is a graph of XRD diffraction patterns of various clay types.

Microstructure of Hybrid: Four different types of organoclays were investigated and the properties of the resulting nanocomposites were measured. The organoclays CLOISITE 30B, I.34TCN and I.34TCA have free OH groups; whereas the clay Nanomer I.44PA has no free OH group in its structure. FIG. 5A represents the XRD patterns of the four different organoclays while FIG. 5B shows the XRD patterns CA/TEC/organoclay hybrids with a clay content of 5 wt. %. It can be seen that the dispersion states of clays in the CA/TEC matrix system depends on the type of the clay used. FIGS. 5A-5D) shows the Nanomer I.44PA clay exhibits peaks in the range of around 3.23° ($d_{001}$ spacing=2.73 nm) due to the organic modified clay. FIG. 5B shows the XRD patterns of the CA/TEC/Nanomer I.44PA hybrid showing an intensive peak at 2θ=2.6°. The appearance of the new peak at 2.6° ($d_{001}$ spacing=3.8 nm) e.g. a shift from the original peak of the clay at 2θ=ca. 3.23° indicates the intercalation of CA/TEC in the gallery of the silicate layer of the Nanomer I.44PA. In FIGS. 5B-C, the CA/TEC/Nanomer I.34TCN hybrid shows a weak peak at 2θ=2.6°, while the Nanomer I.34TCN clay exhibits an intensive double peak at 4.57° and 2.68° (FIGS. 5A-C), indicating the formation of a small amount of intercalated clay and a large amount of exfoliated clay in the nanocomposite structures. Also in the case of the CA/TEC/CLOISITE 30B and Nanomer I.34TCA hybrid, the original peaks of the CLOISITE 30B (at about 5.03° in FIGS. 5A-A) and I.34TCA (at 4.58° in FIGS. 5A-B) are not shown in the hybrid XRD patterns (FIG. 5B-a and -b) which indicates that these organoclays were almost exfoliated in the resulting nanocomposite structures. The different results for various clay types on the morphologies of the resulting nanocomposites as shown by the XRD studies may be related to the functional group of the organically modified clays and their different extent of compatibility with the CA/TEC matrix. From XRD analysis we conclude that the hybrid systems with the organoclays having OH groups (CLOISITE 30B and Nanomer I.34TCA), exhibit the most exfoliated morphologies, whereas the organoclay I.34TCN also having OH groups shows semi-exfoliated type morphology.

The compatibility and interactions between polymer matrix, organic modifiers and the silicate layer surface are important to the formation of intercalated as well as exfoliated PLS nanocomposites (Lebaron, P. C., et al., *Appl. Clay Sci.*, 15 11 (1999)).

To further verify the morphology of nanocomposite structures, TEM micrographs are presented in FIGS. 6A to 6D. The CLOISITE 30B as well as 1.30TCA based nanocomposites showed mostly an exfoliated morphology (FIGS. 6A & 6B) whereas TCN-based nanocomposites (FIG. 6C) showed intercalated morphologies with very little exfoliated structure. As evidenced from FIG. 6D, the clays are aggregated with little evidence on the compatibility of such organoclay with the CA/TEC polymeric matrix. The hydrogen bonding between the hydrophilic OH group of organoclay and polar cellulosic plastic matrix (CA/TEC) might be responsible for the exfoliated/intercalated morphologies of the nanocomposites.

Example 4

Organoclay CLOISITE 30B Content

Figure 7:
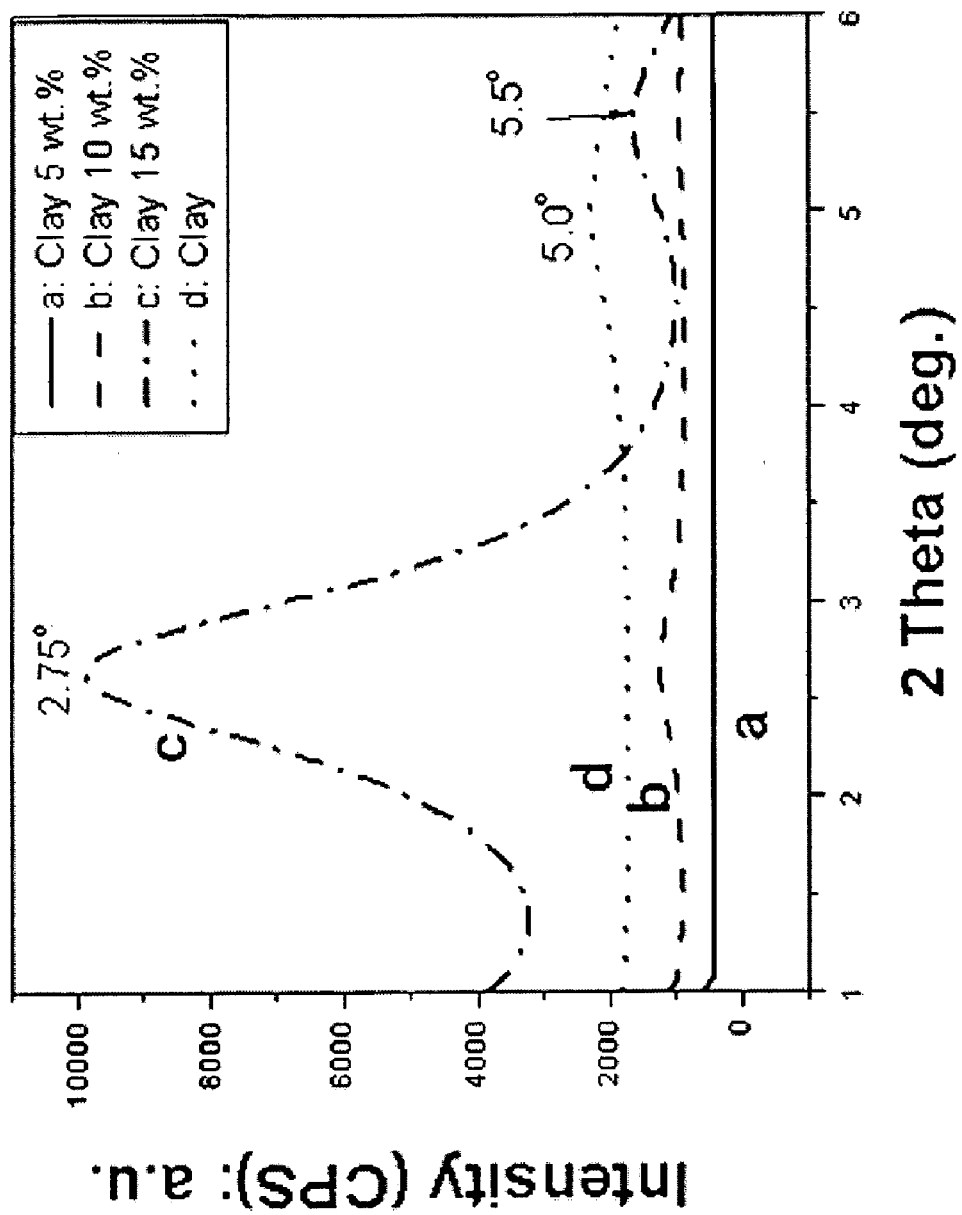
FIG. 7 is a graph of XRD curves of the CA/TEC (80/20 wt. %) with different CLOISITE 30B clay contents; a) clay 5 wt. %, b) 10 wt. %, c) 15 wt. %, d) clay.

Microstructure of Hybrid: As a result of the XRD and TEM studies, the CLOISITE 30B organoclay exhibited the best exfoliation amongst all the organoclays. Subsequent discussions are now based on CLOSITE 30B based nanocomposites with CA/TEC polymeric matrix system. FIG. 7 shows the XRD patterns of the CA/TEC/CLOISITE 30B nanocomposites with different clay content varying from 5-15 wt. %. The peak around 5.03 of the CLOISITE 30B (shown in FIG. 7d) has shifted to around 2.75° (FIG. 7c) for the nanocomposite containing 15 wt. % CLOISITE 30B thereby indicating the predominant intercalated hybrid structures in addition to the aggregation of silicate layers. For the CA/TEC/CLOISITE 30B nanocomposite system with 5 and 10 wt. % CLOISITE 30B content (FIGS. 7a & 7b), no clear peaks were observed at around 2.75, thus suggesting an exfoliated morphology.

lus and glass transition temperature ($T_g$) increase with clay content. The storage modulus of nanocomposite with 15 wt. % clay is 7.1GPa at 30° C., which is about 73% more that of CA/TEC virgin plastic. A possible explanation for improvement of modulus of nanocomposites with increasing clay content might be attributed to the creation of a three-dimensional network of interconnected long silicate layers, stiffening the material through mechanical percolation (Ward, W. J., et al., *J. Mem. Sci.* 55 173 (1991); and Lan, T., et al., *Chem. Mater.* 6 573 (1994)). The shift to higher temperatures and broadening of the tangent delta peak indicates an increase in $T_g$ and broadening of the glass transition temperature of the nanocomposites with an increase of clay content. The shift in $T_g$ as measured by the tangent delta peak was 19° C. for the hybrids containing 15 wt. % CLOISITE 30B (Tg=149° C.) in contrast to CA/TEC plastic ($T_g$=130° C.). The broadening and increase of $T_g$ of hybrids after adding CLOISITE 30B is attributed to the fact that the clay surface may restrict segmental motion.

Figure 9:
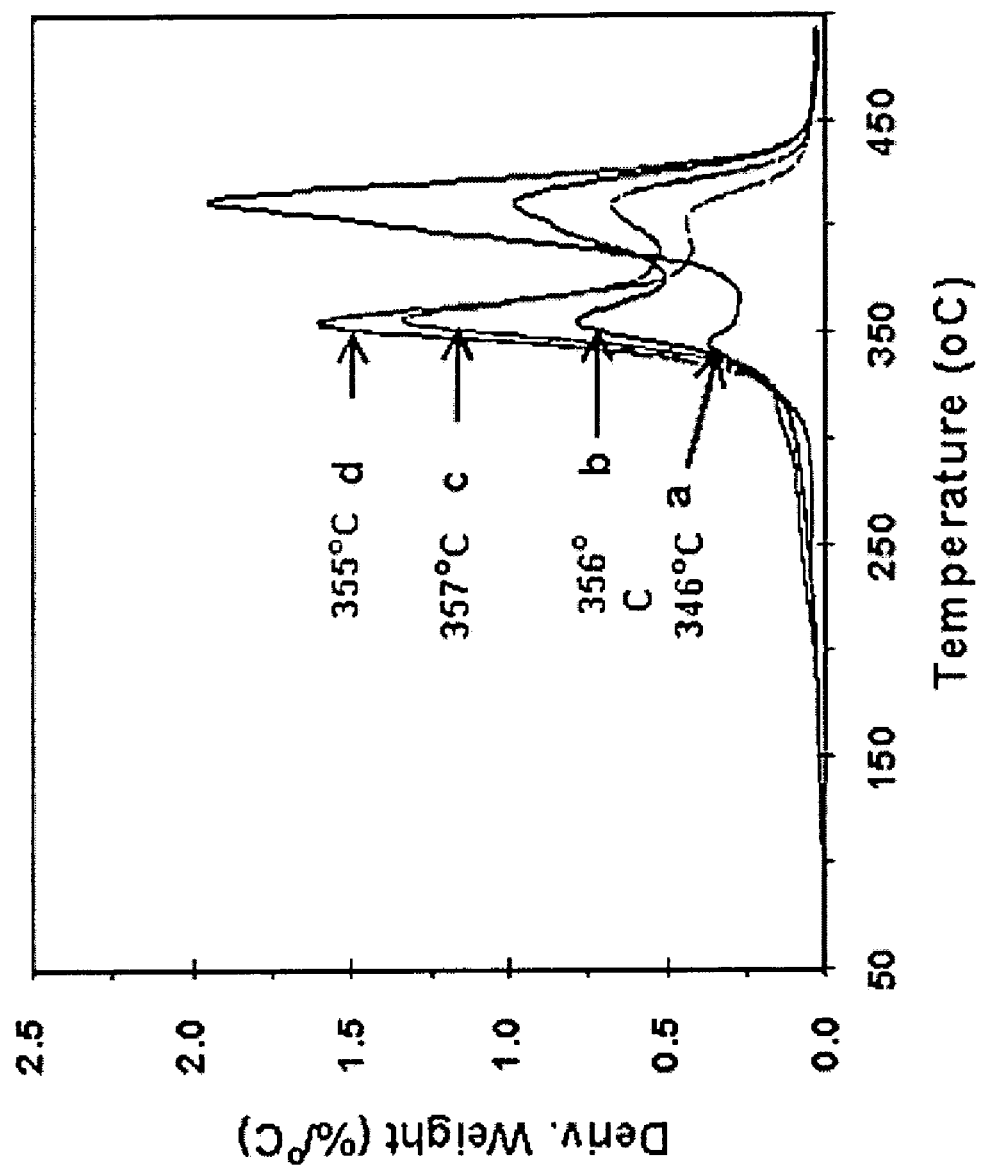
FIG. 9 is a graph of TGA derivative weight loss curve of the CA/TEC (80/20 wt. %) hybrids with varying CLOSITE 30B clay contents 0-15 wt. %; compounding 220° C.

Thermal stability: Based on the TGA curves of the CA/TEC/CLOISITE 30B hybrids, the derivative weight loss curves are shown in FIG. 9. The initial degradation temperature of the CA/TEC/CLOISITE 30B hybrid increased from 346 to 3570C (shown in FIGS. 9a and 9c), which indicates that the thermal stability of cellulosic plastic is increased as a result of nano-reinforcement.

TABLE 3

Mechanical strength, modulus and HDT of the extruded CA/TEC (=80/20 wt. %)/clay hybrids with different clay content: (CA/ TEC = 80/20 wt. %) 100-85 wt. %/clay 0-15 wt. %

| Clay content (wt %) | HDT (° C.) | Properties | | | | | |
|---|---|---|---|---|---|---|---|
| | | Flexural strength (MPa) | Flexural modulus (GPa) | Impact strength (J/M) | Tensile strength (MPa) | Tensile modulus (GPa) | Tensile elongation at break (%) |
| 0 wt. % | 95 | 84 ± 1.7 | 3.1 ± 0.3 | 39 ± 2.8 | 68 ± 2.7 | 2.7 ± 0.4 | 8.5 ± 2.4 |
| 2.5 wt. % | 100 | 90 ± 2.1 | 2.79 ± 0.5 | 25 ± 3.1 | 85 ± 2.1 | 3.5 ± 0.1 | 8.0 ± 1.7 |
| 5 wt. % | 107 | 98 ± 3.0 | 4.1 ± 0.3 | 23 ± 5.3 | 100 ± 1.5 | 4.1 ± 0.3 | 7.6 ± 1.4 |
| 10 wt. % | 124 | 105 ± 4.1 | 4.9 ± 0.34 | 14 ± 3.4 | 119 ± 4.9 | 7.6 ± 0.4 | 6.8 ± 1.5 |
| 15 wt. % | 120 | 101 ± 2.2 | 5.6 ± 0.35 | 13 ± 2.4 | 67 ± 7.2 | 4.4 ± 0.4 | 6.0 ± 1.2 |

Mechanical and Heat Deflection Properties: Table 3 shows the flexural and tensile properties, impact strength, and heat deflection temperature (HDT) data of the CA/TEC (80/20 wt. %)/CLOISITE 30B hybrids with different clay content. The storage modulus and glass transition temperature ($T_g$) increase with clay content. The storage modulus of nanocomposite with 15 wt. % clay is 7.1GPa at 30° C., which is about 73% more than that of CA/TEC virgin plastic. A possible explanation for improvement of modulus of nanocomposites with increasing clay content might be attributed to the creation of a three-dimensional network of interconnected long silicate layers, stiffening the material through mechanical percolation. Correlations of XRD (FIG. 7) and data in Table 3 indicate that the better exfoliation and dispersion of clays in the CA/TEC matrix exhibit superior tensile properties and HDT. However, impact strength of the hybrid is decreased with the addition of any amount of organoclay.

Figure 8:
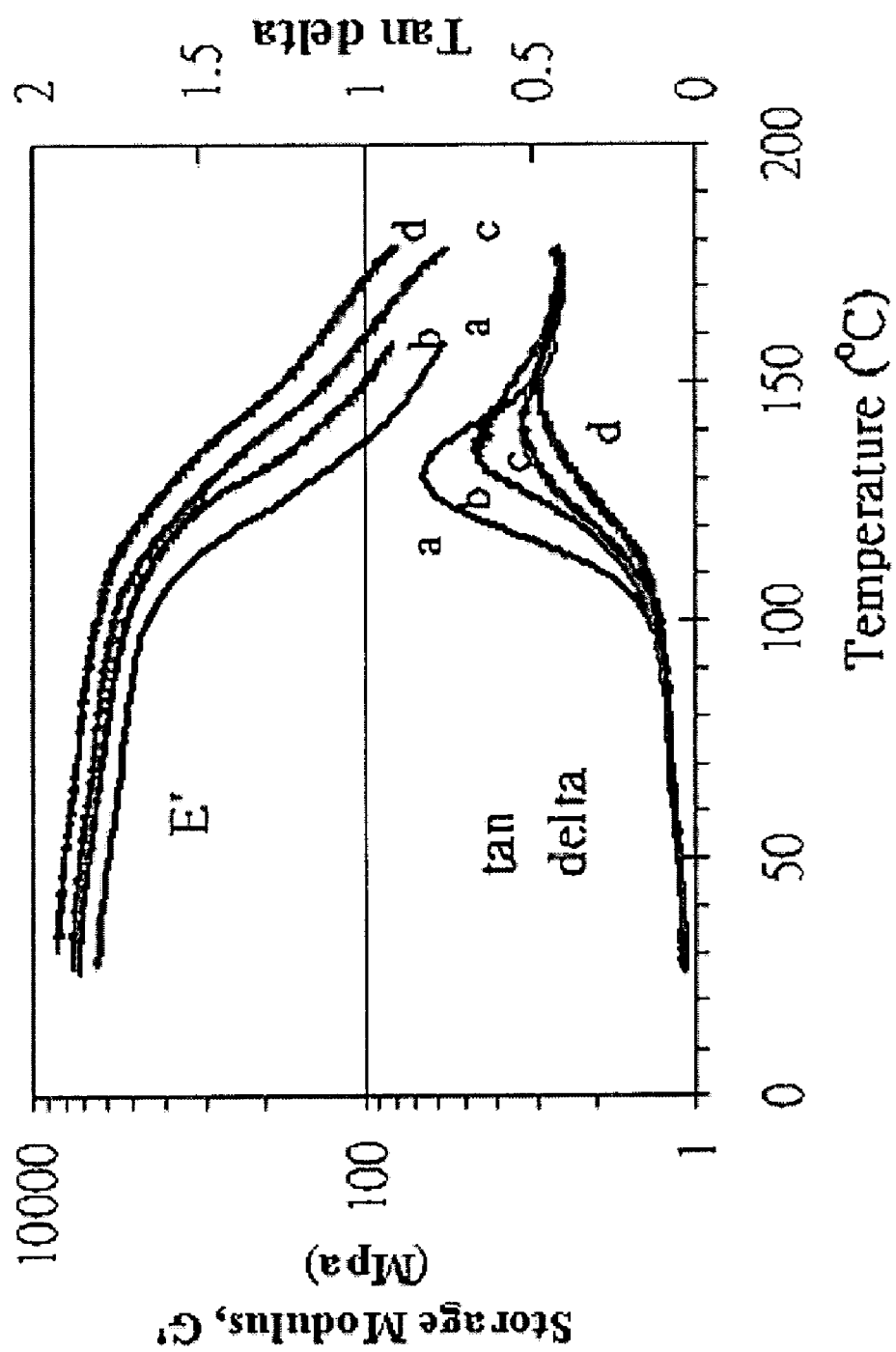
FIG. 8 is a graph of Storage modulus and tan delta curves of the CA/TEC (80/20 wt. %) with different CLOISITE 30B clay contents; compounding 220° C.: a) clay 0 wt. %, b) 5 wt. %, c) 10 wt. %, d) 15 wt. %.

Dynamic Mechanical Properties: FIG. 8 shows the temperature dependence of the storage modulus (E'), and tan delta of cellulosic plastic and the nanocomposites with different content of CLOISITE 30B clay. The storage modu- The thermal stability of nanocomposites does not show any significant improvement with an increase of clay content in the hybrid system.

Example 5

Plasticizer TEC Content

The powdered form of cellulose acetate was plasticized by the addition of a nonsolvent type plasticizer, triethyl citrate (TEC), and then melt compounded with clay to make CA/TEC/clay hybrid nanocomposites. The resulting products were transparent, highly flexible, and had good mechanical properties. The TEC plasticizer content was varied systematically between 15-40 wt %, but the content of organoclay CLOISITE 30B used in the experiments was optimized at 5 wt % The hybrids of different CA/TEC ratios e.g., 85/15, 80/20, 75/25, 70/30, 60/40 wt % and extruding conditions were selected according to the results of the mechanical, heat and microstructural studies. As a result of the plasticization study, the penetration time of TEC plasticizer into the CA powder prior to melt compounding was shown to be a very important parameter to yield a freeflowing powder that will feed properly into the extruders (Bruins, P. F., In *Plastic Technology*; New York Reinhold Publishing Co. Chapman & Hall, Ltd., London, 1, 1-7, 193-199 (1965)). The melt compounding temperature was varied depending on the TEC content, i.e. 220° C., 180° C., 165° C. for CA/TEC 80/20%, 70/30%, 60/40 wt %, respectively. Generally, increasing plasticizer content decreased the melt temperature of plasticized CA plastics; therefore, as the extruding temperature was decreased the color of the extruded plastic was lighter than that of higher temperature extruded plastics.

Mechanical Properties: Table 4 show the flexural, tensile, and impact properties of the CA/TEC (70/30 wt. %)/and/or CLOISITE 30B hybrids with different TEC plasticizer content. The notched Izod impact strength and the tensile elongation at break of the CA/TEC/CLOISITE 30B hybrid increased sharply with increasing TEC content. On the other

*ecules*, 5(6), 2281-2288 (2004)). In general, if the modulus of micro composite material increases, the energy absorption decreases.

In this nanocomposite system, the energy absorption of hybrid nanocomposites increased with modulus. Mulhaupt et al. reported similar experiments with plasticized CA with a cyclic ester plasticizer mixture. They reported that an increase in cellulose acetate percentage leads to an increase of the viscosity during the processing. The softening and melting point was decreased with increasing content of plasticizer, while the decomposition points were increased (U.S. Pat. No. 5,480,922). Our results were similar to that obtained by Mulhaupt et al., who reported that with an increase in the TEC component, the softness of the sample increased. Tensile strength, modulus, and elongation at break decreased. Increased cellulose acetate content shifts the properties in the direction toward pure cellulose acetate.

TABLE 4

Mechanical properties of the extruded CA/TEC/clay hybrid composites with different TEC content: Clay: Cloisite 30B, melt compounding time: 6 ± 2 min.

Figure 10:
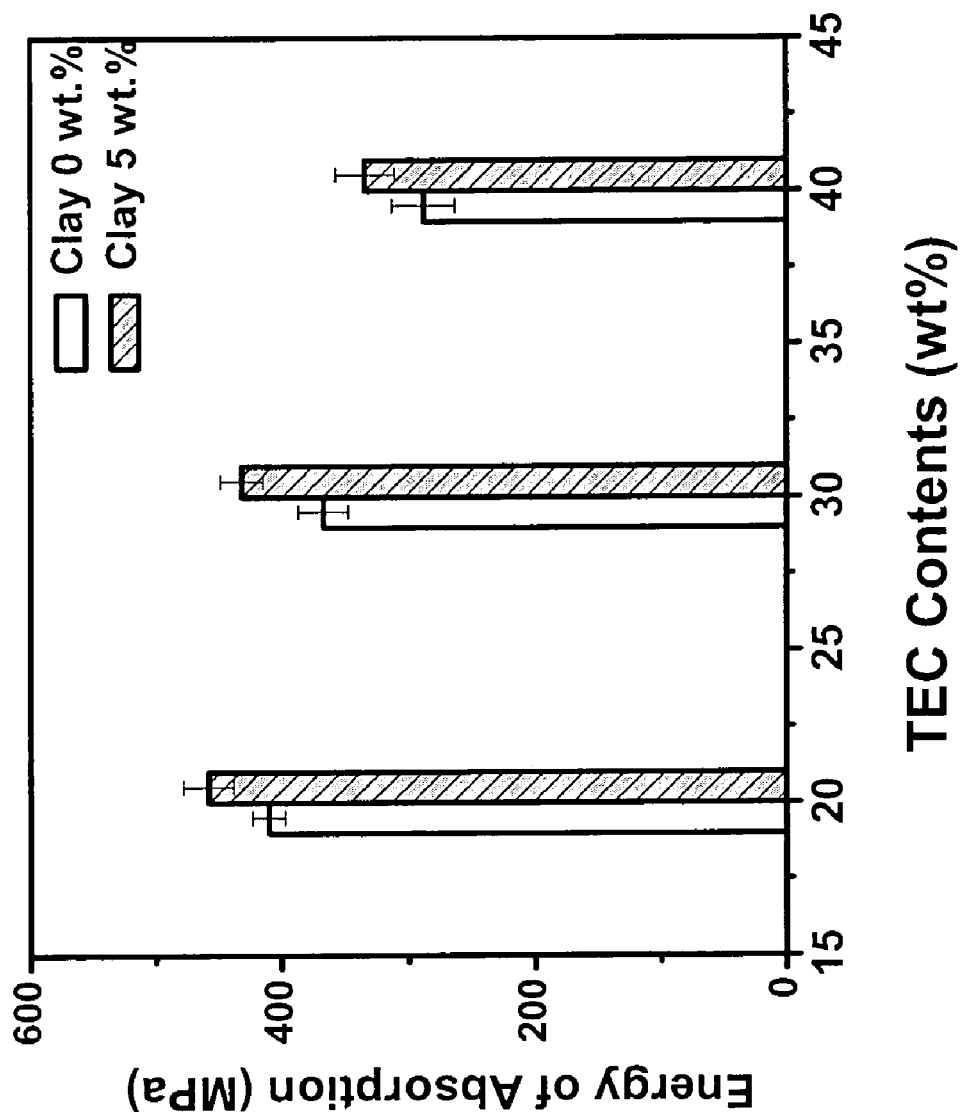
FIG. 10 is a graph of Energy absorption of the CA/TEC/clay hybrid composites with different plasticizer TEC contents at clay 0 or 5 wt. %: CA/TEC (=80/20, 70/30, 60/40 wt. %).

| CA/TEC (wt. %) | Clay Adding (wt %) | Compounding Temp. (° C.) | Flexural Strength (MPa) | Flexural Modulus (GPa) | Tensile strength (MPa) | Tensile Modulus (GPa) | Tensile elongation at break (%) | Impact strength (J/M) |
|---|---|---|---|---|---|---|---|---|
| 85/15 | 0 | 220 | 109 ± 12 | 4.25 ± 0.3 | 81 ± 20.8 | 4.20 ± 0.6 | 5.3 ± 1.2 | 23 ± 11 |
| 80/20 | 0 | 210 | 84 ± 0.9 | 3.54 ± 0.1 | 70 ± 4.4 | 4.1 ± 0.1 | 8.5 ± 2.4 | 39 ± 21 |
| 75/25 | 0 | 195 | 55 ± 1.0 | 2.20 ± 0.1 | 64 ± 9.1 | 2.2 ± 0.6 | 8.8 ± 1.1 | 53 ± 22 |
| 70/30 | 0 | 180 | 48 ± 1.0 | 1.99 ± 0.2 | 61 ± 4.5 | 2.1 ± 0.4 | 11.6 ± 0.1 | 129 ± 45 |
| 60/40 | 0 | 165 | 20 ± 0.5 | 0.80 ± 0.3 | 24 ± 2.7 | 0.8 ± 0.3 | 14.7 ± 0.1 | 184 ± 30 |
| (85/15) 95 | 5 | 220 | 118 ± 1.2 | 5.80 ± 0.5 | 120 ± 6.5 | 5.99 ± 0.2 | 5.0 ± 1.0 | 13 ± 10 |
| (80/20) 95 | 5 | 215 | 98 ± 3.0 | 4.07 ± 0.3 | 105 ± 4.0 | 4.82 ± 0.7 | 7.2 ± 3.0 | 26 ± 5 |
| (75/25) 95 | 5 | 195 | 73 ± 2.5 | 3.80 ± 0.1 | 77 ± 2.4 | 2.8 ± 0.4 | 8.1 ± 0.5 | 37 ± 6 |
| (70/30) 95 | 5 | 180 | 52 ± 0.7 | 2.79 ± 0.1 | 70 ± 4.5 | 2.59 ± 0.4 | 10.0 ± 0.8 | 43 ± 16 |
| (60/40) 95 | 5 | 165 | 25 ± 0.6 | 1.60 ± 0.8 | 39.3 ± 2.0 | 1.7 ± 0.4 | 14.0 ± 3.0 | 38 ± 8 | hand, the strength and modulus (flexural and tensile) of the CA/TEC matrix and CA/TEC/organoclay hybrids decreased with increasing TEC plasticizer contents. The nonsolvent plasticizer TEC acts as an internal lubricant and migrates between the rigid CA molecular chains making them flexible and softening the CA plastic and clay hybrid composites. The tensile modulus of CA/TEC/clay hybrids with varying TEC contents (20%, 30%, and 40% by wt) increased by 51%, 33%, and 110% respectively compared to their CA/TEC matrix counterparts. The maximum strength and modulus (flexural and tensile) of hybrids was attained in the (CA powder 85%/TEC 15%)/clay 5% (CLOISITE 30B) composites, flexural strength (118 MPa) and modulus (5.8GPa). Maintaining a balance between processability and optimum impact and mechanical strength is an important aspect for composites for their application in the automobile industry. Therefore, the 80/20-70/30 wt % of CA/TEC ratio is estimated to be reasonable. The above results indicate that the better exfoliation and good dispersion of clay in the CA/TEC matrix give good mechanical properties. It can be seen from the stress-strain and energy absorption plots (FIG. 10) that with the addition of clay, the energy absorption of hybrid nanocomposites with 20%, 30% and 40% plasticizer contents increased by 12%, 18%, 16%, respectively compared to CA/TEC matrix (Park, H. M., et al., *Biomacromol-*

Table 5 contains the DMA results and the heat deflection temperature (HDT) of these hybrids. Storage modulus and $T_g$ of CA/TEC/clay hybrid composites increased with decreasing plasticizer content. Storage modulus of composite with 20 wt % plasticizer hybrid was found to be 5.71 GPa, twice that of the composite with 40 wt % plasticizer (2.25 GPa). The modulus of these hybrid composites also increased by 73% as compared to 80/20 wt % CA/TEC matrix (4.07 GPa).

TABLE 5

Storage modulus, glass transition temperature (Tg) and heat deflection temperature (HDT) of the CA/TEC/CLOISITE 30B hybrid composites with different plasticizer TEC content; CA/TEC(=80/20, 70/30, 60/40 wt. %) at clay 0 or 5 wt. %

| CA/TEC (wt. %) | Tg(° C.) by tan delta peak | | HDT(° C.) | | Storage modulus (GPa) at 30° C. | |
|---|---|---|---|---|---|---|
| | Clay 0 wt. % | Clay 5 wt. % | Clay 0 wt. % | Clay 5 wt. % | Clay 0 wt. % | Clay 5 wt. % |
| 80/20 | 130 | 138 | 95 | 107 | 4.07 | 5.71 |
| 70/30 | 110 | 114 | 67 | 75 | 2.95 | 3.57 |
| 60/40 | 86 | 95 | 45 | 60 | 1.74 | 2.25 |

A possible explanation for improvement of modulus with reinforcement of clay might be attributed to the creation of a three-dimensional network interconnecting long silicate layers, thereby stiffening the material through mechanical percolation (Ward, W. J., et al., *J. Mem. Sci.*, 55 173 (1991)). An increase in plasticizer content results in a decrease in the $T_g$ of CA matrices. In Table 3, the $T_g$ of CA/TEC 80/20% and 60/40 wt % hybrid is 130° C. and 86° C., respectively. The $T_g$ of CA/TEC 60/40 wt % hybrid was decreased about 30% compared to CA/TEC 80/20 wt %. Increase in plasticizer content increases the segmental motions in the CA backbone there by decreasing the $T_g$. The lubricity theory views the resistance to deformation as arising from intermolecular friction. According to this view, the plasticizer acts as a lubricant to facilitate movement of the resin macromolecules over each other, thus reducing the internal resistance to deformation (Bruins, P. F., In *Plastic technology*; New York Reinhold Publishing Co. Chapman & Hall, Ltd., London, 1, 1-7, 193-199 (1965)).

The shift and broadening of tan δ peak to higher temperatures indicates an increase in $T_g$ and broadening of the glass transition temperature of the nanocomposites with clay content. The shift gap in Tg as measured by the tan δ peak was 8° C. for the hybrids containing 20 wt. % TEC hybrid ($T_g$=138° C.) in contrast to CA/TEC plastic ($T_g$=130° C.). The broadening and increase of $T_g$ of hybrids after adding CLOISITE 30B is attributed to the fact that clay surfaces restrict segmental motions of the parent cellulosic plastic near the organic-inorganic interface. The other possible reason is that chemical bonding of the hydroxyl groups at the interface of the silicate and cellulosic plastic the interface (U.S. Pat. No. 5,554,670)). HDT property is closely related to the $T_g$ of thermoplastics, therefore, HDT behavior of CA/TEC matrices and hybrids were similar to $T_g$ behavior in the DMA results (see Table 5). A plasticized cellulose acetate product results in a moldable product with lower melting point. The plasticized cellulose acetates and hybrids will be especially suited for the production of biodegradable plastics and fibers and filaments from melt compounding and spinning, respectively.

Example 6

Compatibilizer CAB-g-MA Contents

In this example, the development of a suitable compatibilizer for CA nanocomposites is described which is an asset to making exfoliated clay in the organic/inorganic nanocomposites. Organic modified clay is selected having free OH group in the modifier in order to be compatible with the CA matrix. However, completely exfoliated clay nanocomposites cannot be achieved.

As compatibilizer, maleic anhydride grafted cellulose acetate butyrate (CAB-g-MA) was synthesized in order to obtain an interaction between CA and clay hybrid to help clay to exfoliate. Maleic anhydride (MA) is a popular monomer in grafting reactions because the monomer itself does not homopolymerize under the reaction conditions used in grafting reactions. Similar to maleated propylene (MAPP) for clay-propylene (PP) nanocomposites, the maleated CAB is more efficient because CA is polar while PP is nonpolar.

Figure 11A:
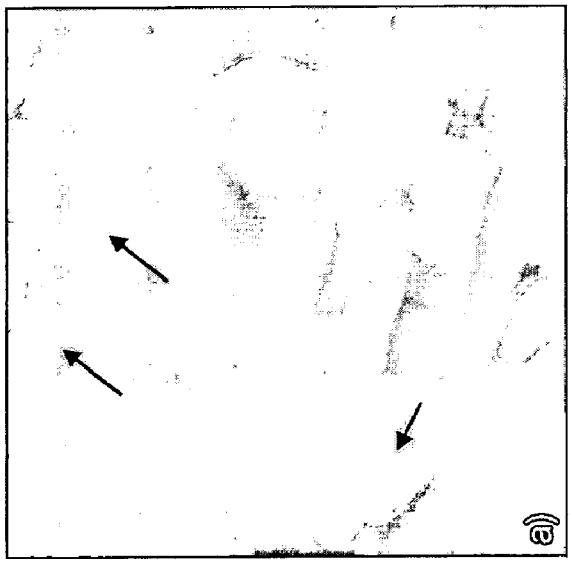
FIGS. 11A, 11B, 11C and 11D are AFM height and phase images of plasticized CA/Compatibilizer/CLOISITE 30B 5 wt. % system: a) topographical view of nanocomposite without compatibilizer, scan size 5 μm; b) topographical view of nanocomposite with compatibilizer 5 wt. %, scan size 5 μm; c) phase image of intercalate clay without compatibilizer, scan size 0.85 μm; d) phase image of intercalate clay with compatibilizer 5 wt. %, scan size 0.5 μm.
Figure 11B:
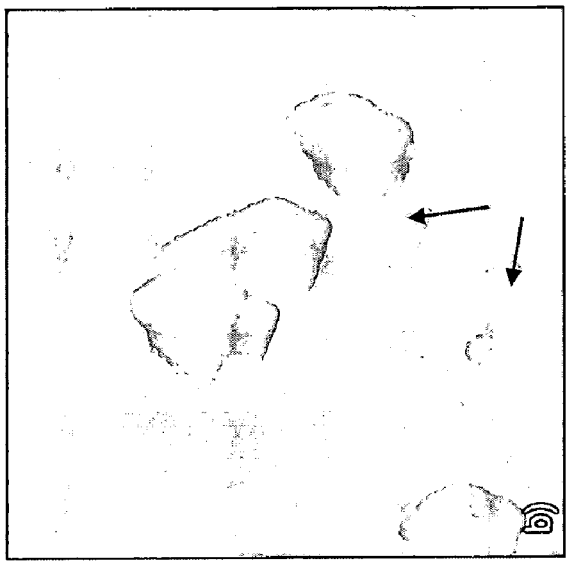
Figures 15A, 15B, 15C:
FIGS. 15A, 15B and 15C are TEM of the plasticized CA/compatibilizer/organoclay hybrids with or without compatibilizer.

Nanostructure of the compatibilizer hybrids: In order to obtain better exfoliated nanocomposites, a compatibilizer was added to pre-plasticized CA/CLOISITE 30B composition with 0, 5, 7.5 wt % content to total hybrids. The 5 wt. % compatibilizer CAB-g-MA (grafting percentage (MA wt.-% were 0.86 wt.-%) hybrid nanocomposite show best morphology and mechanical properties. Therefore, nanocomposites with 5 wt % compatibilizer and without compatibilizer were used to investigate the nanostructure (Park, H. M., et al., *Macromolecules* 37(24) 9076-9082 (2004)). FIG. 11 showed top view AFM height images of the nanocomposites without compatibilizer (FIG. 11A) and with 5 wt % compatibilizer (FIG. 11B), respectively. The AFM images show that the plasticized CA/organoclay/compatibilizer hybrid has better exfoliation effect than the counterparts without compatibilizer. The intercalated structure of clay is dominant in FIG. 11A as labeled by the arrows. Completely exfoliated clay can be clearly seen in FIG. 11B (showed by arrows), which coexist with intercalated clay. The results consistent with TEM images (FIG. 15). It can be seen from the images the clay reinforcement in absence of compatibilizer tends to aggregate, which could be overcome by compatibilizer addition. (FIG. 15C, TEM image and FIG. 11b, AFM image). The width of clay is around 500 nm, and the length is around 800 nm. However, individual platelet thickness cannot be detected from our image, as a reference, the thickness of completely exfoliated clay platelets is 1 nm by AFM image (Piner, R. D., et al., *Langmuir* 19 7995 (2003)), which agrees with our TEM image observation. It was obvious that a pentagon shape clay platelet has been oriented along one direction. This is due to the external force applied on nanocomposite samples by the injection molding process. It was believed that the clay was randomly distributed in the polymer matrix, while external force would induce the orientation of clay inside of polymer. This ordered exfoliated topology was related to the mechanical and barrier properties of nanocomposites.

Figure 11C:
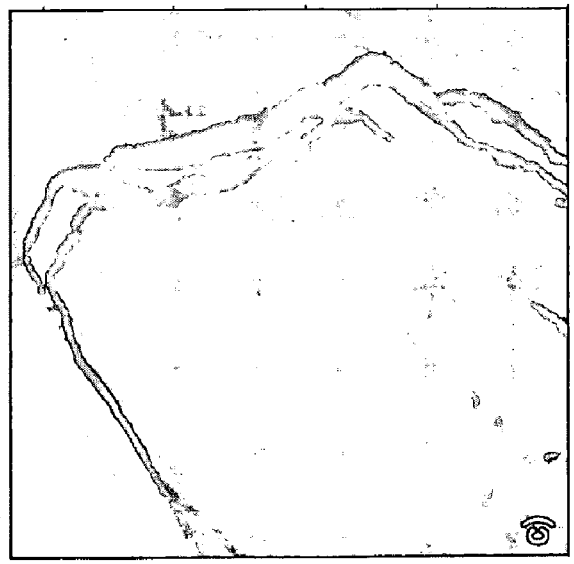
Figure 11D:
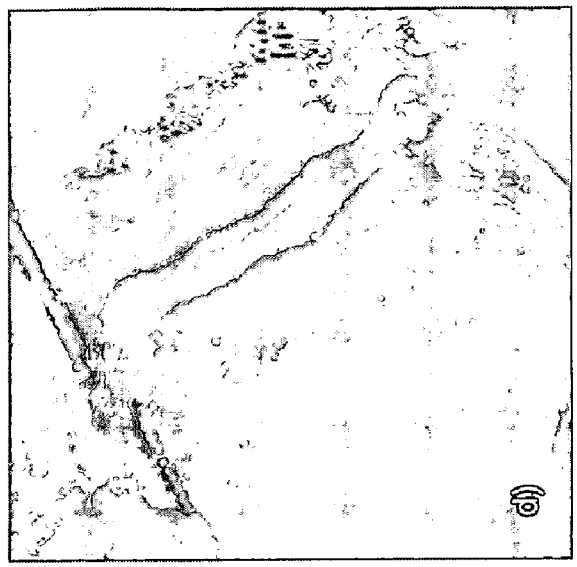
Figures 12A, 12B:
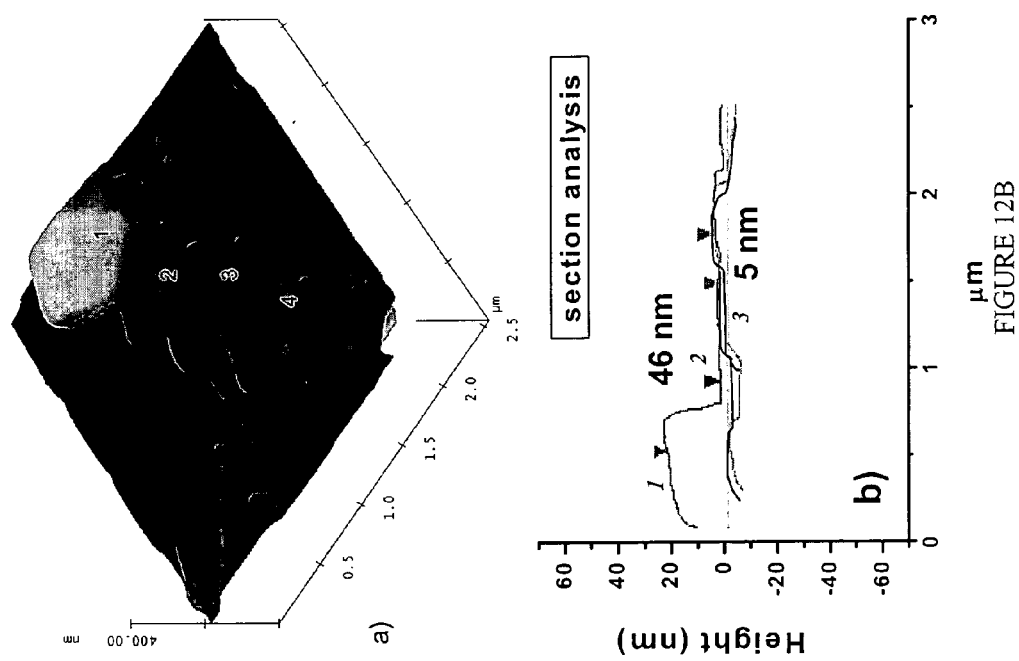
FIG. 12A is a 3 D AFM image/
FIG. 12B is a section analysis graph of intercalated and exfoliated clay platelet in CA/clay/5 wt. % compatibilizer system.

FIGS. 11C and 11D show the 45° titled cross-section AFM phase images of the intercalated CA/organoclay without and with 5 wt % compatibilizer, respectively. Well-defined intercalated clay platelets structure was observed. However, large distances (FIG. 1D, each dark strand thickness is 30-45 nm, total distance is about 156 nm) between intercalated clay platelets were observed for nanocomposite with 5.0 wt % compatibilizer compared to that without compatibilizer (FIG. 11C). AFM was employed to determine the gallery spacing between intercalated and exfoliated clay platelets. FIG. 12 illustrates the intercalated and exfoliated clay platelet in CA/clay/5 wt % compatibilizer system. Several clay platelets are clearly showed in FIG. 12A. The platelet 1 was completed exfoliated with platelet 2, 3, and 4. The section analysis of gallery space between platelet 1 and 2 is around 46 nm, and the space between 3 and 4 is around 5 nm (FIG. 12B). Thus, the compatibilizer exfoliated clay platelet 1 and 2 completely. Platelet 3 and 4 were not fully exfoliated, still keeping intercalated status, which consistent with XRD analysis (FIG. 14C) and TEM image (FIGS. 5-6c). From XRD analysis, the gallery space between two clay platelets is 1.8 nm and 3.7 nm for pure organoclay and CA/clay, respectively (see FIGS. 14A and 14B). When 5% compatibilizer was added, a very small peak around 2.36° was observed, which explain intercalated and exfoliated clay platelets coexistence in the CA/clay/5 wt % compatibilizer system.

Figure 13B:
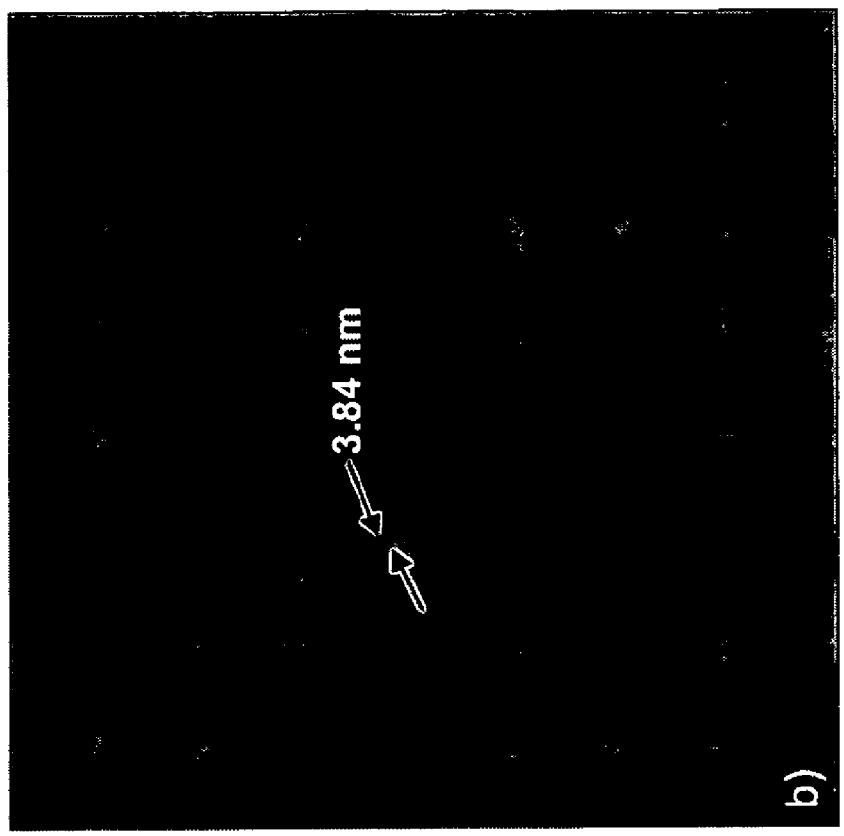
FIGS. 13A and 13B are lateral phase images of CA/clay without compatibilizer system.
Figure 13A:

A tightly bonded intercalated clay platelet structure was observed for nanocomposites without compatibilizer as shown in FIG. 13. Dark lines are polymer intercalated 1 layer thickness (about 3.84 nm), bright yellow parts indicate tightly overlapped multi layered silica clay components because the stiffer crystalline clay component appears as a bright color rather than soft amorphous polymer in tapping phase image. This agrees with XRD results (FIG. 4B $d_{001}$— spacing of intercalated clay in the hybrid nanocomposites is 3.7 nm, 2 θ=2.36°). This result is consistent with the TEM image of intercalated part of without compatibilizer hybrid which showed total 30 nm thickness of 5-6 layer, its individual thickness of intercalated clay is about 5-6 nm, too (FIG. 15B).

Figure 14:
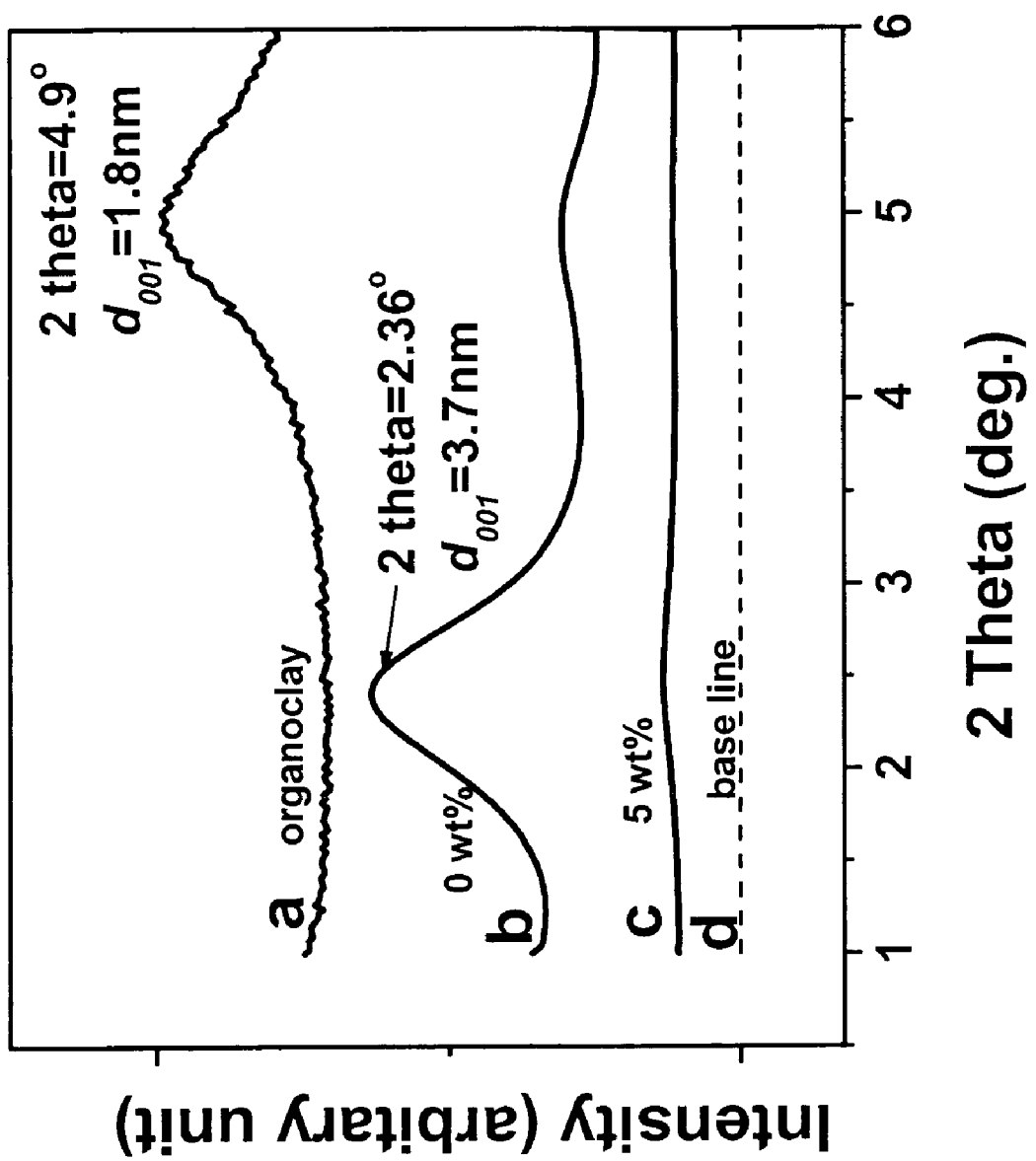
FIG. 14 is a graph of XRD patterns of the plasticized CA/compatibilizer/clay hybrid nanocomposites with different compatibilizer contents: a) neat organoclay, b) compatibilizer 0 wt. %, c) compatibilizer 5 wt. %.

FIG. 14 shows the XRD patterns of pure CLOISITE 30B clay and plasticized CA/CLOISITE 30B nanocomposites with different CAB-g-MA amount. The XRD peak shifted from 5.00 ($d_{001}$ spacing=1.7 nm) for pure CLOISITE 30B to 2.36° ($d_{001}$ spacing=3.7 nm) for plasticized CA/organoclay (95/5 wt.-%) nanocomposite without compatibilizer (FIG. 14B). This indicates significant intercalation and slight exfoliation in the hybrid structure. For plasticized CA/CLOISITE 30B/compatibilizer nanocomposites with 5 wt.-% of compatibilizer, a small peak observed at 2.36° (FIG. 14C) suggests a small amount intercalated organoclays remained in the CA/TEC matrix. Using the Bragg equation (i.e. $1\times\lambda=2\ d_{001}\sin\theta$, here $\lambda=1.541$ nm, X-ray source; $\theta$=XRD diffraction angle), the theoretical diffraction angle of the large intercalated part (46 nm from AFM image, refers to which Figure), $2\theta$ of XRD is calculated to be 0.05°. Therefore, these large intercalated clay platelets of hybrids from the AFM and TEM images can not detected by wide angle XRD ($2\theta>1.0°$).

small intercalated organoclay platelets in CA matrix show about total 30 nm distance of about 5-6 layer clay, individual intercalated thickness is approximately 5-6 nm.

From AFM, XRD, and TEM results, the loading of compatibilizer (CAB-g-MA) is important to making mostly exfoliated state of the plasticized CA/organoclay hybrid nanocomposites. Because the maleated CAB will not only react with the organoclay but also will react with the free OH groups of the CA structure; thus improving the overall compatibilization of entire system. This indicates that compatibilizer is effective in increasing the adhesion between organoclay and CA molecular chains as shown in the FIG. 2. The FTIR curve (FIG. 1d) show the proof of this interaction, CO group of MA 1786-1782 cm$^{-1}$ peak in the CAB-g-MA/organoclay (90/10 wt.-%) nanocomposites was disappeared, it is may be due to ring opening reaction of CO group in MA-g-CAB and free OH of organoclay (this OH come from organo modifier i.e. methyl tallow bis-2-hydroxyethyl quaternary ammonium of CLOISITE 30B) and make a new aliphatic ester structure (this peak is shown at broad complex peak 1770-1725 cm$^{-1}$). This reaction scheme between the compatibilizer and organoclay was shown in Scheme 5.

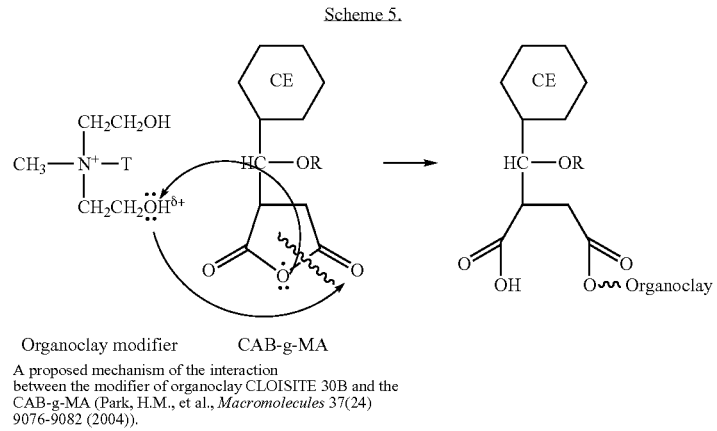

Scheme 5.

Organoclay modifier    CAB-g-MA

A proposed mechanism of the interaction between the modifier of organoclay CLOISITE 30B and the CAB-g-MA (Park, H.M., et al., *Macromolecules* 37(24) 9076-9082 (2004)).

FIG. 15 explains the morphology of the composites. The TEM images show that the plasticized CA/organoclay/compatibilizer hybrid (FIG. 15C) undergoes better exfoliation and dispersion than the counterparts without compatibilizer ((FIGS. 15A and 15B). From FIG. 15A, it can be seen that some of the intercalation and aggregation of clay remain in the matrix. It can also be observed from FIGS. 5-6b that Mechanical Properties: Tables 6 and 7 show the tensile, flexural, and notched Izod impact, heat deflection temperature (HDT), and coefficient of thermal expansion (CTE) properties of the plasticized CA/CLOISITE 30B/CAB-g-MA hybrids with different compatibilizer contents. The strength and modulus (flexural and tensile) of the hybrid sharply increased with increasing compatibilizer contents.

TABLE 6

Tensile and flexural properties of plasticized A/CLOISITE 30B/compatibilizer CAB-g-MA hybrids.

| Sample No | Plasticized CA Matrix (wt. %) | Organoclay contents (wt. %) | Compatibilizer (wt. %) | Tensile Strength (MPa) | Tensile Modulus (GPa) | Tensile Elongation (%) | Flexural Strength (MPa) | Flexural Modulus (GPa) |
|---|---|---|---|---|---|---|---|---|
| A | 100 | 0 | 0 | 70.0 ± 5.1 | 2.20 ± 0.1 | 8.8 ± 1.2 | 65.4 ± 2.0 | 2.37 ± 0.2 |
| b | 92.5 | 0 | 7.5 | 74.0 ± 6.3 | 3.0 ± 0.9 | 7.5 ± 0.8 | 67.3 ± 0.9 | 2.44 ± 0.2 |
| c | 95 | 5 | 0 | 81.8 ± 5.9 | 3.6 ± 0.6 | 10.0 ± 0.2 | 74.7 ± 0.9 | 2.68 ± 0.5 |

TABLE 6-continued

Tensile and flexural properties of plasticized
A/CLOISITE 30B/compatibilizer CAB-g-MA hybrids.

| Sample No | Plasticized CA Matrix (wt. %) | Organo-clay contents (wt. %) | Compatibilizer (wt. %) | Tensile Strength (MPa) | Tensile Modulus (GPa) | Tensile Elongation (%) | Flexural Strength (MPa) | Flexural Modulus (GPa) |
|---|---|---|---|---|---|---|---|---|
| d | 90 | 5 | 5 | 84.7 ± 0.9 | 3.7 ± 0.6 | 9.5 ± 1.2 | 81.7 ± 0.9 | 3.09 ± 0.6 |
| E | 87.5 | 5 | 7.5 | 84.2 ± 1.9 | 3.7 ± 0.4 | 8.6 ± 0.9 | 77.4 ± 1.2 | 2.97 ± 0.4 |

TABLE 7

Notched Izod impact strength, HDT, and coefficient
of thermal expansion (CTE) properties of plasticized
CA/CLOISITE 30B/compatibilizer CAB-g-MA hybrids.

| Sample No. | Plasticized CA Matrix (wt. %) | Organo-clay contents (wt. %) | Compat-ibilizer (wt. %) | Impact Strength (J/m) | HDT (° C.) | CTE (um/m° C.) |
|---|---|---|---|---|---|---|
| A | 100 | 0 | 0 | 55 ± 6 | 85 ± 3 | 125 ± 7 |
| B | 92.5 | 0 | 7.5 | 35 ± 13 | 96 ± 2 | 110 ± 9 |
| C | 95 | 5 | 0 | 25 ± 4 | 90 ± 3 | 102 ± 3 |
| D | 90 | 5 | 5 | 29 ± 1 | 98 ± 3 | 94 ± 10 |
| E | 87.5 | 5 | 7.5 | 13 ± 1 | 94 ± 4 | 92 ± 6 |

On the other hand, the notched Izod impact strength and the tensile elongation at break of the hybrids decreased with increasing compatibilizer contents. This indicates that compatibilizer is effective in increasing the adhesion between organoclay and CA molecular chains. The tensile strength and modulus of hybrids with 5-wt % compatibilizer increased by 20%, and 68% respectively compared to hybrids with no compatibilizer. Also flexural strength and modulus were increased about 20 and 25% respectively. HDT increased 10% and CTE decreased up to 24%, at 5-wt % MA-g-CAB loaded hybrid making the nanocomposites more stable in comparison to the pure matrix. Izod impact strength decreased about 50%. HDT property is closely related to the $T_g$ of thermoplastics, therefore, HDT behavior of plasticized CA matrices and hybrids were similar to $T_g$ behavior from DMA curve. The 5-wt % compatibilizer loading is optimum for HDT, CTE, and mechanical improvement. The above results indicate that the better exfoliation and good dispersion of clay in the plasticized CA matrix gives good mechanical properties.

Comparative Example 7

The CA/PP/Organoclay Blend Hybrid Nanocomposites

A petroleum based polypropylene (PP) compounded with a layered silicate nanocomposites is being used in an automobile application. In this example, the renewable resource based biodegradable CA nanocomposite is compared with the petroleum based PP nanocomposites. The CA nanocomposites composition is CA-Plasticized/CAB-g-MA/CLOISITE 30B (92/5/5 wt. %). PP nanocomposites composition is PP/maleic anhydride grafted PP (MA-g-PP)/Nanomer I.30P (85/5/10 wt. %) hybrids which are all processed in the DSM melt compounding system. The PP is a homopolymer powder (Basell Pro-Fax 6301), MI=12 g/10 min, specific gravity 0.9 respectively. Nanomer I.30P is octadecyl amine modified montmorillonite which was used as an organoclay for PP nanocomposites.

Figure 16:
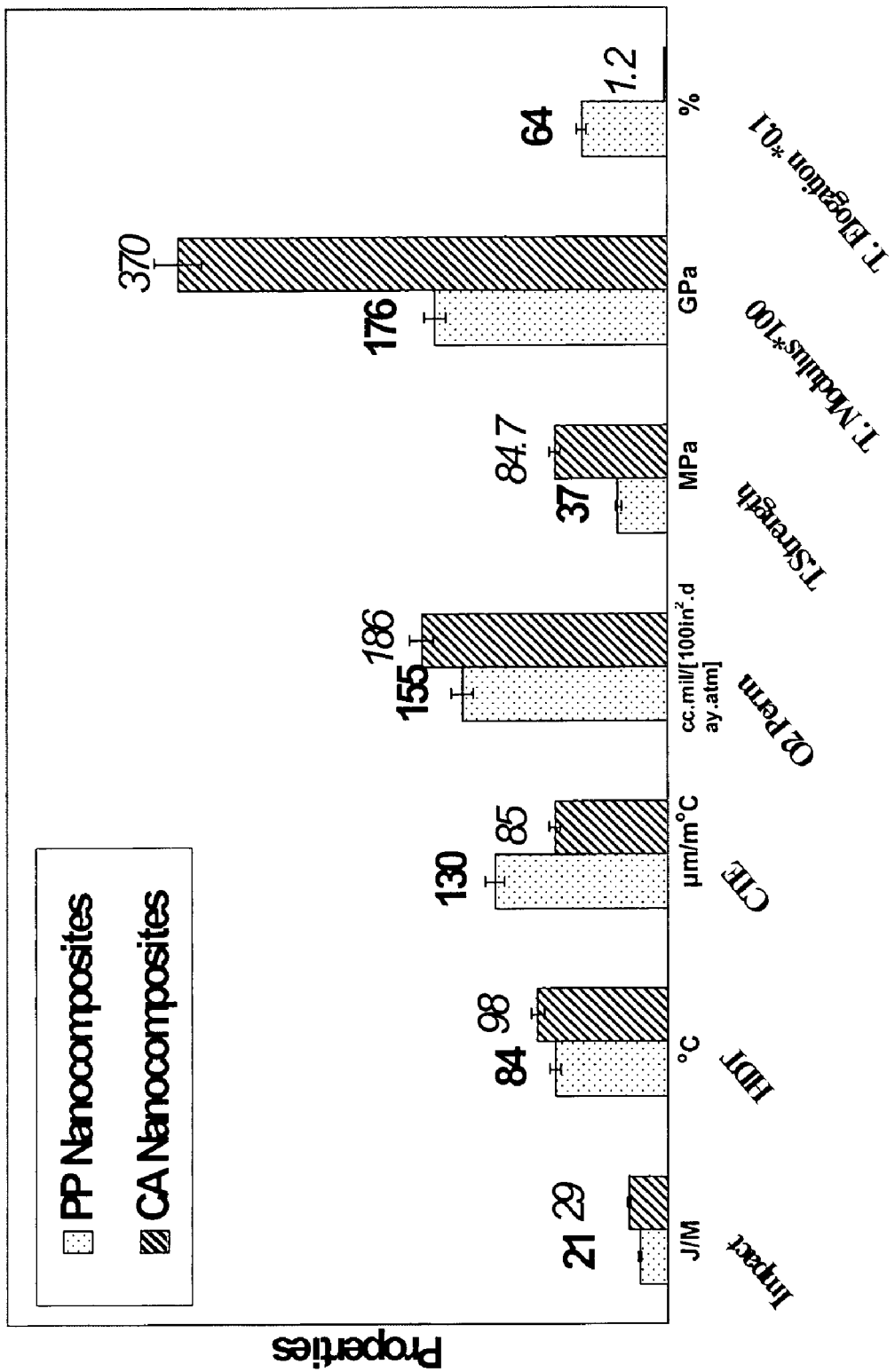
FIG. 16 is a graph of Comparative properties of the plasticized CA/compatibilizer/organoclay hybrid or PP/compatibilizer/organoclay hybrid nanocomposites: CA.

Table 8, Table 9, and FIG. 16 are a comparative properties the CA/organoclay or PP/organoclay hybrid nanocomposites. CA nanocomposites show superior tensile and flexural strength and modulus, better dimension stability and HDT compared to PP nanocomposites. Tensile and flexural properties of CA/TEC/compatibilizer/organanoclay hybrids are 100% greater than PP nanocomposites. But, PP nanocomposites have higher elongation at break, better barrier (water vapor and oxygen gas) and better processibility via extruding & injection molding, cheaper materials (0.5 $/lb, compare to CA/clay 1.8 $/lb).

The results from this patent will anticipate the novel cellulosic plastic-clay based nanocomposites, a potential for replacing/substituting polypropylene-clay nanocomposites for future 'green' automotive parts.

TABLE 8

The tensile and flexural properties of the CA/
organoclay or PP/clay hybrid nanocomposites.

| Sample No | Tensile Strength (MPa) | Tensile Modulus (GPa) | Tensile Elongation (%) | Flexural Strength (MPa) | Flexural Modulus (GPa) |
|---|---|---|---|---|---|
| PP | 36.3 ± 0.7 | 1.02 ± 0.10 | 743 ± 60 | 33.5 ± 1.1 | 1.04 ± 0.10 |
| PP 85/clay 5/comp10 wt. %[*1] | 37.1 ± 0.8 | 1.76 ± 0.1 | 644 ± 70 | 38.1 + 1.5 | 1.41 ± 0.14 |
| PP/CA(45/45)/ clay 5/comp 5 wt. % | 35.7 ± 1.2 | 1.87 ± 0.10 | 3.2 ± 0.2 | 50.5 ± 0.1 | 2.32 ± 0.25 |
| PP/CA(22.5/67)/clay 5/comp 5 wt. % | 40.5 ± 2.4 | 2.67 ± 0.10 | 2.3 ± 1.5 | 54.6 ± 2.3 | 2.70 ± 0.10 |
| CA 84/clay 10/comp 6 wt. % | 83.1 ± 1.0 | 4.58 ± 0.40 | 9.0 ± 1.3 | 83.2 ± 0.9 | 3.90 ± 0.60 |
| CA 90/clay 5/comp 5 wt. %[*2] | 84.7 ± 0.9 | 3.70 ± 0.60 | 9.5 ± 1.2 | 81.7 ± 0.9 | 3.29 ± 0.60 |

TABLE 8-continued

The tensile and flexural properties of the CA/
organoclay or PP/clay hybrid nanocomposites.

| Sample No | Tensile Strength (MPa) | Tensile Modulus (GPa) | Tensile Elongation (%) | Flexural Strength (MPa) | Flexural Modulus (GPa) |
|---|---|---|---|---|---|
| Plasticized CA/comp (92.5/7.5 wt. %) | 74.0 ± 6.3 | 2.7 ± 0.9 | 7.5 ± 0.8 | 67.3 ± 0.9 | 2.44 ± 0.2 |
| Plasticized CA | 70.0 ± 5.1 | 2.20 ± 0.10 | 8.8 ± 1.2 | 65.4 ± 2.0 | 2.37 ± 0.20 |

*[1]PP/MA-g-PP/Nanomer I.30P (85/5/10 wt. %)
*[2]CA-Plasticized (CA/TEC = 75 25 wt %), compatibilizer CAB-g-MA 5 wt. %, clay CLOISITE 30B 5 wt. %.

TABLE 9

The thermal and various properties of the
CA/organoclay or PP/clay hybrid

| Sample No | Izod Impact Strength (J/m) | HDT (° C.) | Oxygen Permeability (cc-mil/ [100 in²- day · atm] | Water vapor Permeability (gm-mil/ [100 in²- day · in Hg] | CTE (um/m° C.) |
|---|---|---|---|---|---|
| PP | 25 ± 4 | 82 ± 4 | 206 ± 32 | 0.22 ± 0.15 | 145 ± 8 |
| PP 85/clay/comp10 wt. %*[1] | 21 ± 1 | 84 ± 2 | 155 ± 25 | 0.11 ± 0.05 | 130 ± 10 |
| PP/CA(45/45 wt %)/ clay 5%/comp 5% hybrid | 15 ± 2 | 94 ± 2 | 178 ± 9 | 3.54 ± 12 | 98 ± 8 |
| PP/CA(22.5/67 wt %)/ clay 5%/comp 5% | 17 ± 2 | 97 ± 2 | 143 ± 18 | 18.16 ± 8 | 92 ± 10 |
| CA 84%/clay 10 wt %/ comp 6 wt % | 20 ± 3 | 100 ± 3 | 104 ± 59 | 43.2 ± 13 | 71 ± 16 |
| CA 90/clay 5/comp 5 wt. %*[2] | 29 ± 1 | 98 ± 3 | 186 ± 30 | 68 ± 10 | 85 ± 8 |
| Plasticized CA/comp (92.5/7.5 wt. %) | 35 ± 13 | 96 ± 2 | 194 ± 21 | 78 ± 14 | 110 ± 9 |
| Plasticized CA | 55 ± 6 | 85 ± 3 | 269 ± 50 | 90 ± 23 | 125 ± 7 |

*[1]PP/comp = PP-g-MA/Nanomer I.30P (85/5/10 wt. %)
*[2]CA-Plasticized (CA/TEC = 75 25 wt. %), comp = compatibilizer CAB-g-MA 5 wt. %, clay CLOISITE 30B 5 wt. %.

The substance and advantages of the present invention will become increasingly apparent by reference to the following drawings and the description.

It is intended that the foregoing description be only illustrative of the present invention and that the present invention be limited only by the hereinafter appended claims.

We claim:

1. A polymer composition which comprises a melt compounded mixture which comprises;
   (a) a cellulose ester as a matrix for the composition;
   (b) an organically modified layered clay in an amount between 1 and 20% by weight of the composition; and
   (c) a synthesized compatibilizer comprising cellulose linked to an anhydride group which exfoliates the clay and reacts with hydroxyl groups on the cellulose ester and hydroxyl groups on the clay to bind the cellulose ester and clay together, wherein the compatibilizer is present in an amount between 0.1 and 20% by weight of the synthesized compatibilizer.

2. The composition of claim 1 wherein the cellulose ester is cellulose acetate.

3. The composition of claim 1 wherein the cellulose ester is cellulose acetate butyrate.

4. The composition of claim 1 wherein the cellulose ester is cellulose acetate propionate.

5. The composition of any one of claims 1, 2, 3 or 4 wherein the cellulose ester has a degree of substitution of between about 1.20 and 2.95 and a degree of polymerization between about 150 and 300.

6. The composition of any one of claims 1, 2, 3 or 4 wherein a plasticizing agent which is an organic ester is provided in the composition.

7. The composition of any one of claims 1, 2, 3 or 4 wherein a plasticizing agent which is selected from the group consisting of triethylcitrate and bis(2-ethylbenzyl) adipate is provided in the composition.

8. The composition of any one of claims 1, 2, 3 or 4 wherein a weight ratio of a plasticizing agent to cellulose ester is between about 10 to 90 and 40 to 60 is provided in the composition.

9. The composition of claim 1 wherein the clay is a smectite clay.

10. The composition of claim 1 wherein the clay is a onium ion modified clay.

11. The composition of claim 10 wherein the onium anion is selected from the group consisting of bis(2-hydroxymethyl) tallow ammonium and bis-2-hydroxyethyl hydrogenated tallow.

12. The composition of claim 1 wherein the anhydride group is a maleic anhydride derived group.

13. A process for preparing a polymer composition which comprises melt compounding of cellulose ester matrix, optionally a plasticizing agent, organically modified layered clay in an amount between 1 and 20% by weight of the composition, and a synthesized compatibilizer comprising cellulose linked to an anhydride group which exfoliates the clay and reacts with hydroxyl groups on the clay and hydroxyl groups on the cellulose ester to bind the cellulose ester and clay together, wherein the compatibilizer is present in an amount between 0.1 and 20% by weight of the synthesized compatibilizer.

14. The process of claim 13 wherein before the melt compounding, the cellulose ester and plasticizing agent are mixed together.

15. The method of claim 13 in which said melt compounding is for 1 minute to 4 hours.

16. The process of claim 13, wherein dispersing of the clay into the cellulose ester matrix is carried out by mixing the clay and a pre-plasticized cellulose ester at temperatures in the range of 150 to 250°C. followed by melt compounding for 1 to 20 minutes.

17. The process of claim 13, wherein the anhydride group is maleic anhydride linked to a second cellulose ester.

18. A method in accordance with claim 17, wherein the maleic anhydride comprises 0.1 to 20% by weight of the synthesized compatibilizer which has grafted maleic anhydride contents which are 0.1-30 wt %.

19. The process according to claim 18 wherein synthesized compatibilizer is added in a weight content of 0.5 to 30 wt % of the composition.

20. The process according to claim 14 wherein the compatibilizer is mixed with cellulose ester and clay which have been premixed before the melt compounding and then fed to an extruder.

21. The process according to claim 14 wherein the melt compounding is for 1 minute up to 1 hour.

22. The composition of claim 1 which has a tensile and a flexible strength between 20 and 130 MPa, a tensile and a flexible modulus between 1 and 8 MPa, a modulus between 1 and 8 GPa, and a tensile stretch between 1 and 50%.

23. The composition of claim 1 which has impact strength between 20 and 200 J/M and a coefficient of thermal expansion between 70 and 150 (um/m° C.).

24. The composition of claim 1 which has oxygen gas permeability between 100 and 300 (cc-mil)/[100in$^2$-day.atm]and water vapor permeability between 40 and 90 (gm-mil)/[100in$^2$-day.in Hg]).

25. The composition of claim 1 which has a heat deflection temperature between 90 and 130° C.

* * * * *

UNITED STATES PATENT AND TRADEMARK OFFICE
CERTIFICATE OF CORRECTION

| | |
|---|---|
| PATENT NO. | : 7,253,221 B2 |
| APPLICATION NO. | : 11/111362 |
| DATED | : August 7, 2007 |
| INVENTOR(S) | : Amar K. Mohanty et al. |

It is certified that error appears in the above-identified patent and that said Letters Patent is hereby corrected as shown below:

Column 11, line 13, "CAB-G-MA" should be --CAB-g-MA--.

Column 13, line 45, "from 5.00 for" should be --from 5.0° for--.

Column 16, line 25, "from 346 to 3570C" should be --from 346 to 357°C--.

Column 20, line 35, "FIG. 1D" should be --Figure 11D--.

Column 21, line 8, "5.00" should be --5.0°--.

Signed and Sealed this

Fourth Day of March, 2008

JON W. DUDAS
*Director of the United States Patent and Trademark Office*